United States Patent
Groth

(10) Patent No.: US 12,232,446 B2
(45) Date of Patent: *Feb. 25, 2025

(54) HARVESTING SYSTEM INCLUDING MODULAR UNITS

(71) Applicant: Square Head Inc., Kendrick, ID (US)

(72) Inventor: Robert Paul Groth, Kendrick, ID (US)

(73) Assignee: Square Head Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/362,521

(22) Filed: Jul. 31, 2023

(65) Prior Publication Data

US 2023/0397535 A1  Dec. 14, 2023

Related U.S. Application Data

(63) Continuation of application No. 16/912,650, filed on Jun. 25, 2020, now Pat. No. 11,712,003.

(51) Int. Cl.
  *A01D 43/00*  (2006.01)
  *A01D 41/133*  (2006.01)
  (Continued)

(52) U.S. Cl.
  CPC ......... *A01D 43/003* (2013.01); *A01D 41/133* (2013.01); *A01D 43/006* (2013.01);
  (Continued)

(58) Field of Classification Search
  CPC ............................... A01D 43/006; B60P 3/42
  See application file for complete search history.

(56) References Cited

U.S. PATENT DOCUMENTS

| 3,534,537 A | 10/1970 | Buchele et al. |
| 3,572,663 A | 3/1971 | Lely |

(Continued)

FOREIGN PATENT DOCUMENTS

| CN | 113287424 | 5/2022 |
| DE | 2005286 | 8/1970 |

(Continued)

OTHER PUBLICATIONS

Ofice Action for U.S. Appl. No. 16/912,650, mailed Oct. 6, 2022, Groth, "Harvesting System Including Modular Units", 23 pages.

(Continued)

*Primary Examiner* — Thomas B Will
*Assistant Examiner* — Madeline I Runco
(74) *Attorney, Agent, or Firm* — Lee & Hayes, P.C.

(57) ABSTRACT

A harvesting system includes at least one modular unit coupled to a harvester includes a drying unit to dry a harvested material introduced into the harvester including at least one rotating drum, a number of appendages extending from the at least one rotating drum, at least one sensor to determine at least one environmental state within the drying unit, and at least one environmental state adjustment device to adjust at least one environmental attribute within the drying unit. The modular unit also includes a collection unit to collect the harvested material into a unit, a first conveyor mechanism to convey the harvested material from the drying unit to the collection unit, and a control system to control at least the harvester, the drying unit, the collection unit, the first conveyor mechanism, the sensor, and the environmental state adjustment device based on a signal received from the at least one sensor.

20 Claims, 11 Drawing Sheets

(51) Int. Cl.
*A01D 57/02* (2006.01)
*A01D 67/00* (2006.01)
*A01F 15/00* (2006.01)

(52) U.S. Cl.
CPC ............ *A01D 57/02* (2013.01); *A01D 67/00* (2013.01); *A01F 15/00* (2013.01)

(56) References Cited

U.S. PATENT DOCUMENTS

| | | |
|---|---|---|
| 3,981,083 A | 9/1976 | Danford |
| 4,021,929 A | 5/1977 | Black |
| 4,038,758 A | 8/1977 | Miller |
| 4,060,960 A | 12/1977 | Hengen et al. |
| 4,548,131 A | 10/1985 | Williams |
| 4,846,198 A | 7/1989 | Carnewal et al. |
| 5,105,563 A | 4/1992 | Fingerson et al. |
| 5,557,859 A | 9/1996 | Baron |
| 6,125,617 A | 10/2000 | Villers et al. |
| 7,942,601 B2 | 5/2011 | Bohman et al. |
| 10,076,081 B2 | 9/2018 | Verhaeghe et al. |
| 10,670,338 B2 | 6/2020 | Wingard, Jr. et al. |
| 11,500,379 B2* | 11/2022 | Posselius ............... B62D 7/142 |
| 2013/0291507 A1 | 11/2013 | Williams |
| 2014/0075776 A1 | 3/2014 | Potter et al. |
| 2019/0116733 A1 | 4/2019 | Wire et al. |
| 2020/0319637 A1* | 10/2020 | Posselius ................. B60P 3/42 |
| 2021/0400874 A1 | 12/2021 | Groth |
| 2022/0015296 A1 | 1/2022 | Joanyr de Barros et al. |
| 2023/0000019 A1* | 1/2023 | Dreher ................ A01D 89/003 |

FOREIGN PATENT DOCUMENTS

| | | |
|---|---|---|
| DE | 3447522 | 7/1986 |
| DE | 3447906 | 7/1986 |
| DE | 3447900 | 8/1986 |
| DE | 3500070 | 1/1988 |
| DE | 20215926 | 12/2002 |
| DE | 10254954 | 6/2004 |
| DE | 102004003011 | 8/2008 |
| DE | 102014016498 | 5/2016 |
| DE | 202016105815 | 10/2016 |
| DE | 102020104515 | 8/2021 |
| EP | 3804499 | 4/2021 |
| EP | 3729949 | 4/2023 |
| FR | 2845562 | 2/2005 |
| KR | 930007903 U | 5/1993 |
| KR | 940000131 Y1 | 1/1994 |
| WO | WO2012010235 | 1/2012 |
| WO | WO2019092250 | 5/2019 |
| WO | WO2020162283 | 8/2020 |

OTHER PUBLICATIONS

International Preliminary Report on Patentability for PCT Application No. PCT/US20/60767, mailed May 6, 2022.
PCT Search Report and Written Opinion mailed Feb. 17, 2021 for PCT Application No. PCT/US20/60767, 10 pages.

* cited by examiner

HARVESTING SYSTEM INCLUDING MODULAR UNITS

RELATED APPLICATIONS

This application claims priority to and is a continuation of U.S. patent application Ser. No. 16/912,650, filed Jun. 25, 2020 (now issued as U.S. Pat. No. 11,712,003), the entire contents of which are incorporated herein by reference.

BACKGROUND

The present disclosure relates to crop harvesting. Specifically, the present disclosure relates to the harvesting and collection of a crop by harvesting, conditioning, drying, and collecting the crop in a single pass and avoiding lengthy periods of field drying.

TECHNICAL FIELD

In agricultural processes, a crop may be harvested and collected in individualized units such as bales, cubes, or pellets. Such crops include any grass, legume, or other herbaceous plant, and may include, for example, any plant that may be rendered as animal fodder for animals such as cattle, horses, goats, sheep, pigs, rabbits, and other livestock. When harvested, the crop may be left in the field to dry or "cure." Drying of the crop reduces the risk of mold or mildew forming in the crop that may otherwise occur in the crop if the crop were immediately collected into a bale, a cube, or pelletized. Further, baling, cubing, or pelletizing the crop before it is dried poses a significant risk of spontaneous combustion where the collected crop self-ignites due to the heat produced by bacterial fermentation of the crop. If the crop is stored in a way so the heat cannot escape, the heat buildup increases the rate of decomposition and thus the rate of heat buildup increases. Once ignition temperature is reached, combustion occurs with oxidizers present (e.g., oxygen). Thus, drying is an essential process when harvesting the crop.

However, field drying of the crop may take several days depending on a number of environmental parameters including humidity, dew points, temperature, an amount of moisture drawn into the crop as it lays on the ground, and occurrences of precipitation, among others. Further, in the drying process, the crop may be cut or swathed, and raked into long, narrow piles known as windrows (a process called windrowing) to prepare the crop for collection into bales, cubes, or pellets. Excess humidity and or the occurrence of precipitation may result in a loss in crops. If it precipitates while the crop is drying, turning the windrow can also allow it to dry faster. However, turning the hay too often or too roughly may cause drying leaf matter to fall off, reducing the nutrients available to the livestock. The crop may become bleached by the sun as it lays in the field for drying, and in instances where the crop becomes wet during drying results in a decrease in proteins and nutrients. Loss of these proteins and nutrients results in an inferior or unsatisfactory feed product that may not pass sufficient proteins or nutrients onto the livestock. In the case where the crop is oat, barley, or other grain crop, the grain may end up being dropped and left in the field after collection.

Further, the time required to allow the crop to dry results in a significant delay in watering the crop again to allow the crop to grow for a second cutting or harvest. This may result in a loss of potential income. Still further, in the drying process, the crop may be cut or swathed, and raked into long, narrow piles known as windrows (a process called windrowing) to prepare the crop for collection into bales, cubes, or pellets. These processes may include the use of a plurality of different machines or equipment that increases capital expenditures as well as maintenance and operation costs associated with the machines. In sum, it may prove as costly or more costly to put up a poor-quality crop as it may be to put up a relatively higher-quality crop.

Examples of the present disclosure are directed toward overcoming the deficiencies described above.

SUMMARY

In an example of the present disclosure, a harvesting system includes a harvester and at least one modular unit mechanically coupled to the harvester and powered by the harvester. The modular unit includes a drying unit to dry a harvested material introduced into the harvester. The drying unit includes at least one rotating drum, a number of appendages extending from the at least one rotating drum, at least one sensor to determine at least one environmental state within the drying unit, and at least one environmental state adjustment device to adjust at least one environmental attribute within the drying unit. The modular unit also includes a collection unit to collect the harvested material into a unit, a first conveyor mechanism to convey the harvested material from the drying unit to the collection unit, and a control system to control at least the harvester, the drying unit, the collection unit, the first conveyor mechanism, the sensor, and the environmental state adjustment device based on a signal received from the at least one sensor.

In another example of the present disclosure, a modular unit for attachment to a harvester includes a drying unit to dry a harvested material introduced into the harvester. The drying unit includes at least one rotating drum, a number of appendages extending from the at least one rotating drum, at least one sensor to determine at least one environmental state within the drying unit, and at least one environmental state adjustment device to adjust at least one environmental attribute within the drying unit. The modular unit also includes a collection unit to collect the harvested material into a unit, a first conveyor mechanism to convey the harvested material from the drying unit to the collection unit, and a control system to control at least the drying unit, the collection unit, the first conveyor mechanism, the sensor, and the environmental state adjustment device based on a signal received from the at least one sensor.

In yet another example of the present disclosure, one or more non-transitory computer-readable media storing executable instructions that, when executed by one or more processors of at least one control system to control at least one function of a modular unit coupled to a harvester, cause the one or more processors to perform operations. The operations include instructing at least one sensor to detect at least one environmental state within a drying unit containing a harvested material, activating an environmental state adjustment device to adjust the at least one environmental state within the drying unit, and determining that the harvested material is ready for collection by a collection unit based on the at least one environmental state detected within the drying unit.

DETAILED DESCRIPTION

As described above, cutting and leaving crops on a field for drying over a number of days have significant negative effects on the economy of crop harvesting and may compromise safety to farmers and others. The harvester and modular units described herein allow for a crop to be cut, conditioned, dried, and collected (e.g., baled, cubed, or pelletized) in a single pass through the field and in one session or period with no other machinery or equipment being used in this process. The modular units may each include a drying unit and one of a type of collection units such as a baler, a cuber, or a pelletizer in mechanical communication with the drying unit.

Figure 1:
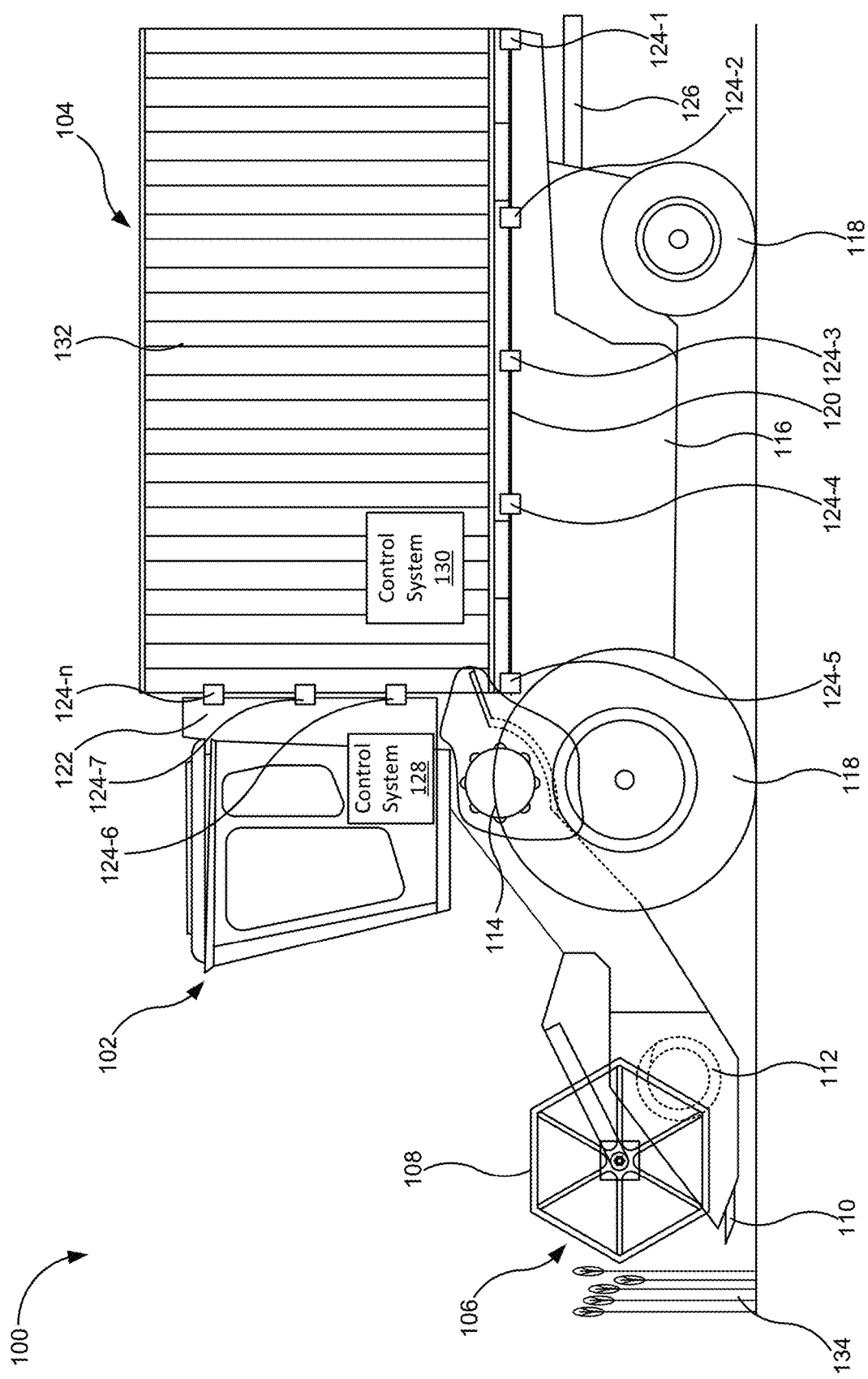
FIG. 1 is a schematic illustration of a harvesting system, according to an example of the principles described herein.

Wherever possible, the same reference numbers will be used throughout the drawings to refer to the same or like parts. Referring to the figures, FIG. 1 is a schematic illustration of a harvesting system 100, according to an example of the principles described herein. The harvesting system 100 may include a harvester 102 and at least one modular unit 104. The fluid system 814 may include any coupled to the harvester 102. The harvester 102 carries the modular unit 104, and together the harvester 102 and the modular unit 104 are able to cut (e.g., harvest), condition, dry, and collect a standing crop 134. The standing crop 134 may include, for example, any grass, legume, or other herbaceous plant. More specifically, the standing crop 134 may include grasses such as ryegrass, timothy, brome, fescue, Bermuda grass, orchard grass, and other grass species, legumes, such as alfalfa (e.g., Lucerne) and clovers (e.g., red, white, and subterranean), pasture forbs, oat, barley, wheat, straw, plant materials of these plant varieties, and combinations thereof.

The harvester 102 includes a header 106 used to harvest the standing crop 134. The header 106 may include, for example, a reel 108, which serves to supply the standing crop 134 to a cutting bar 110 and a screw conveyor 112. The reel 1082 may be driven by a hydraulic motor, a pneumatic motor, a mechanical motor or other device about its longitudinal axis. The cutting bar 110 cuts the standing crop 134 and the screw conveyor 112 conveys the harvested material from the standing crop 134 to a conditioner 114. The conditioner 114 serves to crimp and crush the newly harvested standing crop 134 to promote faster and more even drying. A conditioner may include at least one grooved roller and a substrate between which the harvested material is forced through, causing the stalks to split, and allowing liquid trapped behind cell walls (e.g., sap and cell sap) to leak out and also giving more surface area for evaporation.

The harvester 102 may also include a chassis 116 and a number of wheels 118 driven by the harvester 102 to cause the harvester 102 to move about an area such as a field where harvesting is to be performed. In one example, the harvester 102 may be driven using an all-wheel drive or other types of drive systems. Further, in one example, the harvester may include self leveling systems that cause the harvester 102 to remain level with the surface of the field where the standing crop 134 is being harvested. The chassis 116 may include a platform 120 on which the modular unit(s) 104 seat and are coupled to the harvester 102. The modular unit(s) 104 are coupled to the platform 120 and a rear bulkhead 122 of the harvester 102 via a number of mechanical coupling devices 124-1, 124-2, 124-3, 124-4, 124-5, 124-6, 124-7, 124-$n$, where n is any integer greater than or equal to 1 (collectively referred to herein as mechanical coupling device(s) 124 unless specifically addressed otherwise). The mechanical coupling devices 124 may include, for example, bolts, nuts, dowels, pins, cams, clamps, fasteners, clips, rivets, screws, hooks, links latches, and levers, quick release skewers, among a variety of other coupling devices. The harvester 102 may also include a hitch 126 coupled to the chassis 116 for coupling a number of additional units or devices to the harvester 102 such as, for example, trailers, hopper devices, and bale carriers, among other devices. In one example, the hitch 126 may be used to pull a wagon or other equipment wagons that could be loaded with an overhead auger arm from the pelletizing and cubing modular unit(s) 104 described herein. Once the wagons are loaded, the harvester 102 or another tractor may move the pellets or cubes back to a storage facility or silo for off-loading, while replacing the wagon with an empty wagon so harvesting may continue.

In one example, the mechanical coupling devices 124 may include a number of elements that reduce or eliminate vibrations, noise, and/or wear on components such as, for example, a hardwood such as teak, rubber, polytetrafluoroethylene (PTFE), or similar material that may be placed between the harvester 102 and the modular unit 104, and/or within the modular unit 104 between elements therein. These elements that reduce or eliminate vibrations, noise, and/or wear may be, for example, approximately 0.5 to 1.0 inches thick.

The modular unit 104 may include a plurality of different modular unit(s) 104 that may be electrically, pneumatically, hydraulically, mechanically, and/or physically coupled to the harvester 102. As described herein, the plurality of modular unit(s) 104 include a drying unit to dry the harvested material and one of a type of collection units to collect and package the harvested material. More regarding the types of modular unit(s) 104 that may be coupled to the harvester 102 are described herein. The ability to couple a plurality of different modular unit(s) 104 to the harvester 102 allows for an economic way to purchase agricultural equipment without having to purchase separate, specialized equipment to perform different functions.

The harvester 102 may include a control system 128 and/or the modular unit(s) 104 may include a control system 130. The control systems 128, 130 serve to control the various functions and operations of the harvester 102 and the modular unit(s) 104 as described herein including, for example, activation and deactivation of the header, the conditioner 114, a number of conveyor systems used to move the harvested material through the harvester 102 and the modular units 104, and the elements within the modular unit(s) 104 including the drying unit 302 and collection units and their respective devices and elements described herein. In the examples described herein, the conveyor systems may be manufactured to include materials capable of withstanding heating and cooling temperatures that may occur within the harvesting system 100 and especially within the drying units of the modular unit(s) 104 described herein.

Figure 2:
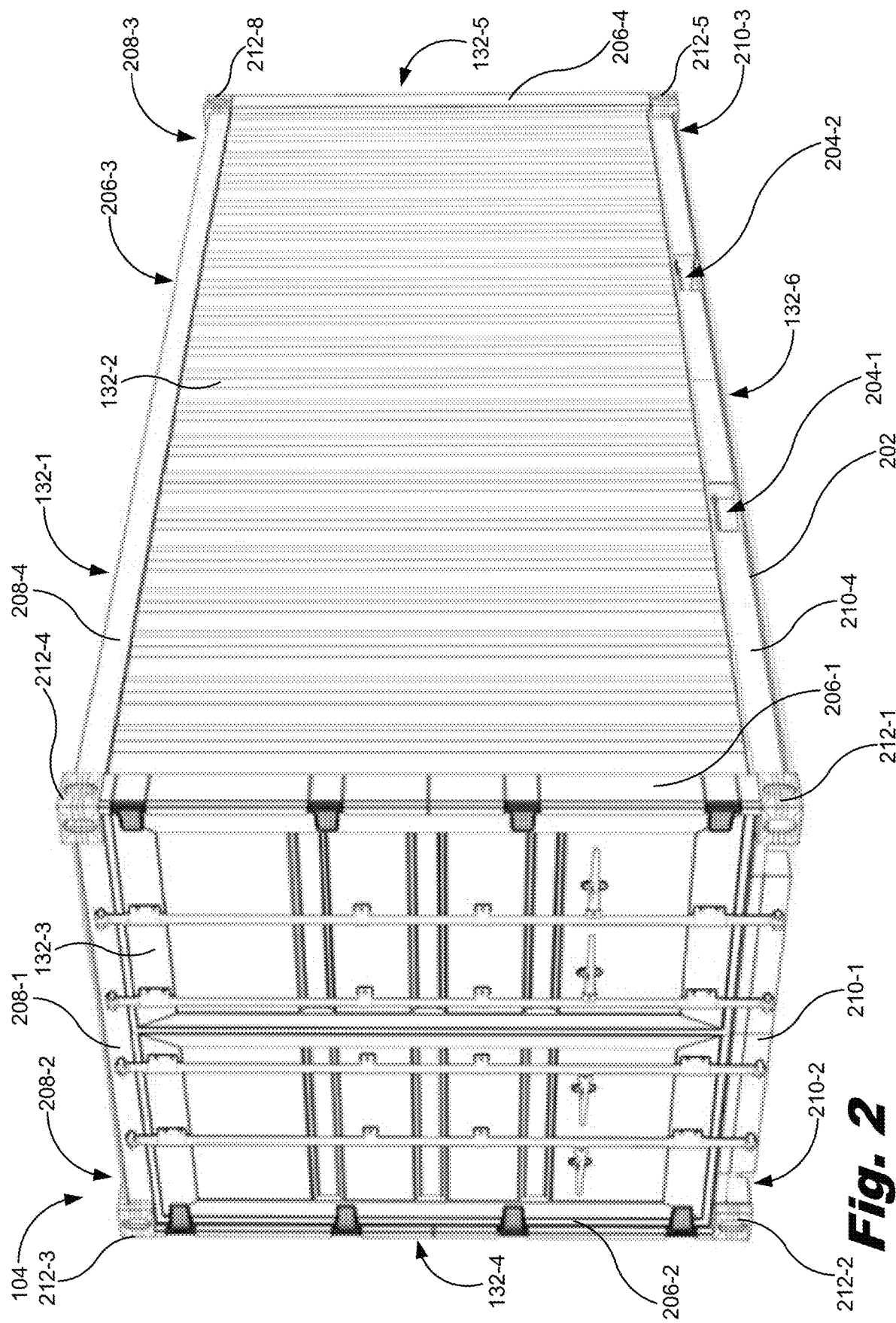
FIG. 2 is a perspective, schematic illustration of a modular unit for forming rectangular bales, according to an example of the principles described herein.

FIG. 2 is a perspective, schematic illustration of a modular unit for forming rectangular bales, according to an example of the principles described herein. Thus, with reference to FIGS. 1 and 2, the modular unit(s) 104 may include a number of panels 132-1, 132-2, 132-3, 132-4, 132-6, 132-6 (collectively referred to herein as side panel(s) 132 unless specifically addressed otherwise) that include including a top panel 132-1, four side panels 132-2, 132-3, 132-4, 132-5, and a bottom panel 132-6. The modular unit(s) 104 may also include a frame to support the panels 132. The top panel 132-1, a third side panel 132-4, the fourth side panel 132-5, and the bottom panel 132-6 are not shown in FIG. 2 as they are obstructed by the first side panel 132-2 and the second side panel 132-3.

The modular unit 104 depicted in FIG. 2 is depicted as an intermodal shipping container designed and built for intermodal freight transport and may be used across different modes of transport such as, for example, from ship to rail to truck without unloading and reloading the cargo contained inside. In the application described herein, the intermodal shipping container form factor allows the drying unit, the collection unit and other elements contained within the several modular unit(s) 104 to remain therein without a need to off-load these devices in order to use them in connection with the harvester 102 in order to harvest, condition, dry, collect and put up the harvested material. Further, the enclosure provided by the side panels 132 of the intermodal shipping container form factor reduces or eliminates wear on the components within the modular unit 104 that may otherwise occur should the components be exposed to the environmental elements. In one example, the side panels 132 may be designed to be removable or separable from the modular unit 104. In this example, the contents of the modular unit 104 may be exposed to an environment exterior to the modular unit 104 to allow for heat to transfer more quickly and fluidly from the modular unit 104 during operation. The side panels 132 may be removed when, for example, the environment exterior to the modular unit 104 does not include precipitation (e.g., during nominal harvesting periods) to thermally dump internal heat and moisture within the modular unit 104 to an area exterior to the modular unit 104. The intermodal shipping container form factor may include an approximately 20-foot-long intermodal shipping container, but may include a length, height, and/or depth. In one example, the intermodal shipping container form factor may include an approximately 40-foot-long intermodal shipping container to process additional amounts of harvested material as described herein.

The side panels 132 are coupled together via a frame including a number of corner pillars 206-1, 206-2, 206-3, 206-4 (collectively referred to herein as corner pillar(s) 206 unless specifically addressed otherwise), a number of top joists 208-1, 208-2, 208-3, 208-4 (collectively referred to herein as top joist(s) 208 unless specifically addressed otherwise), and a number of bottom joists 210-1, 210-2, 210-3, 210-4 (collectively referred to herein as bottom joist(s) 210 unless specifically addressed otherwise). The corner pillars 206, top joists 208, and bottom joists 210 may be coupled together using fasteners or via welding or by monolithically forming the corner pillars 206, top joists 208, and bottom joists 210 as a single piece. In one example, the top panel 132-1 and the bottom panel 132-6 may be permanently or monolithically formed with the corner pillars 206, and joists 208, 210.

In one example, and as depicted in FIG. 2, the second side panel 132-3 and the fourth side panel 132-5 may include doors that may be opened during operation and when coupled to the harvester 102. In one example, the doors depicted on the side panels 132-3 and 132-5 may not exist, and may be replaced with panels including the first door 326 and the third or rear doors 420, 520, 620 depicted in FIGS. 3 through 6. In one example, the third or rear doors 420, 520, 620 may include a panel to install for storage. During harvest the third or rear doors 420, 520, 620 are opened in order to expel the bales, pellets or cubes. This allows harvested material to be introduced into the modular unit 104 for drying by the drying unit and collection into bales, cubes, and pellets, and allows for the collected, harvested material to be dispensed from the modular unit 104 into the field area or onto another device for transport.

Further, in one example, the side panels 132 may be selectively removed from the corner pillars 206, the top joists 208, and the bottom joists 210 during operation. In this example, the side panels 132 may be selectively coupled to the corner pillars 206, the top joists 208, and the bottom joists 210 after use for storage purposes.

In one example, the modular unit 104 may include a number of handling elements to assist a user in lifting the modular unit onto and off of the chassis 116 of the harvester 102. The handling elements may include forklift apertures 204-1, 204-2 defined in a base 202 of the modular unit 104, the base being defined by the bottom joists 210. The forklift apertures 204-1, 204-2 allow for the forks of a forklift device to be inserted therein and lifted onto and off of the harvester 102. Further, in one example, the handling element may include a number of twist lock corner castings 212-1, 212-2, 212-3, 212-4, 212-5, 212-6, 212-7, 212-8 (collectively referred to herein as twist lock corner casting(s) 212 unless specifically addressed otherwise) located at each corner of the modular unit 104. Twist lock corner castings 212-6 and 212-7 are obstructed in FIG. 2 by the remainder of the elements of the modular unit 104. The female portion of the twist lock connector formed by the twist lock corner castings includes the 7×7×4½ in (180×180×110 mm) corner casting, which is fitted to the corners of the modular unit 104, and has no moving parts, but includes at least one oval-shaped hole. The male component of the twist lock connector may be referred to as a male twist lock, which is fitted to cranes or other lifting equipment. The male twist lock may be inserted through the hole, and then the top portion (normally pointed to make insertion easier) is rotated 90° so that it cannot be withdrawn from the oval-shaped hole.

With reference again to the forklift apertures 204 and the twist lock corner castings 212, farmers may often have equipment to interface with these elements of the modular unit 104. For example, a farmer may possess a front-end loader or similar tractor to which a set of bucket forks or a set of male twist locks attached to a bucket of the front-end loader. The male twist locks may include, for example, the male twist locks described in U.S. Pat. No. 7,942,601, the entirety of which is incorporated herein and as an example only. In this manner, existing equipment may be utilized without significant additional expense to the user. As will be described in more detail below, the twist lock system including the twist lock corner castings 212 and the male twist locks may also be used to secure the modular unit 104 to the platform 120 of the harvester 102 and to secure different modular unit(s) 104 to a storage surface and one another for storage.

Figure 3:
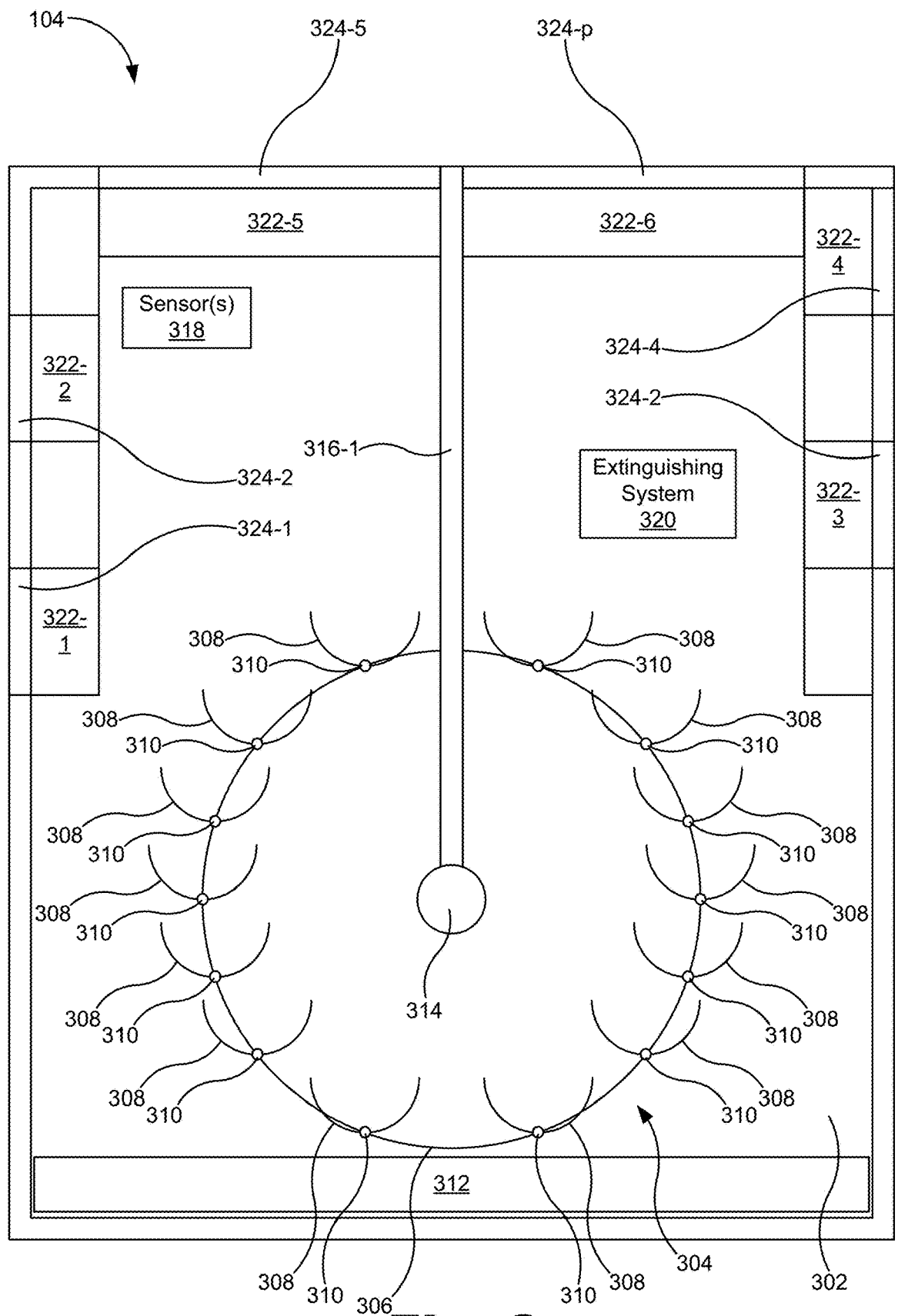
FIG. 3 is a side, cut-away schematic illustration of a drying unit of a modular unit, according to an example of the principles described herein.
Figure 4:
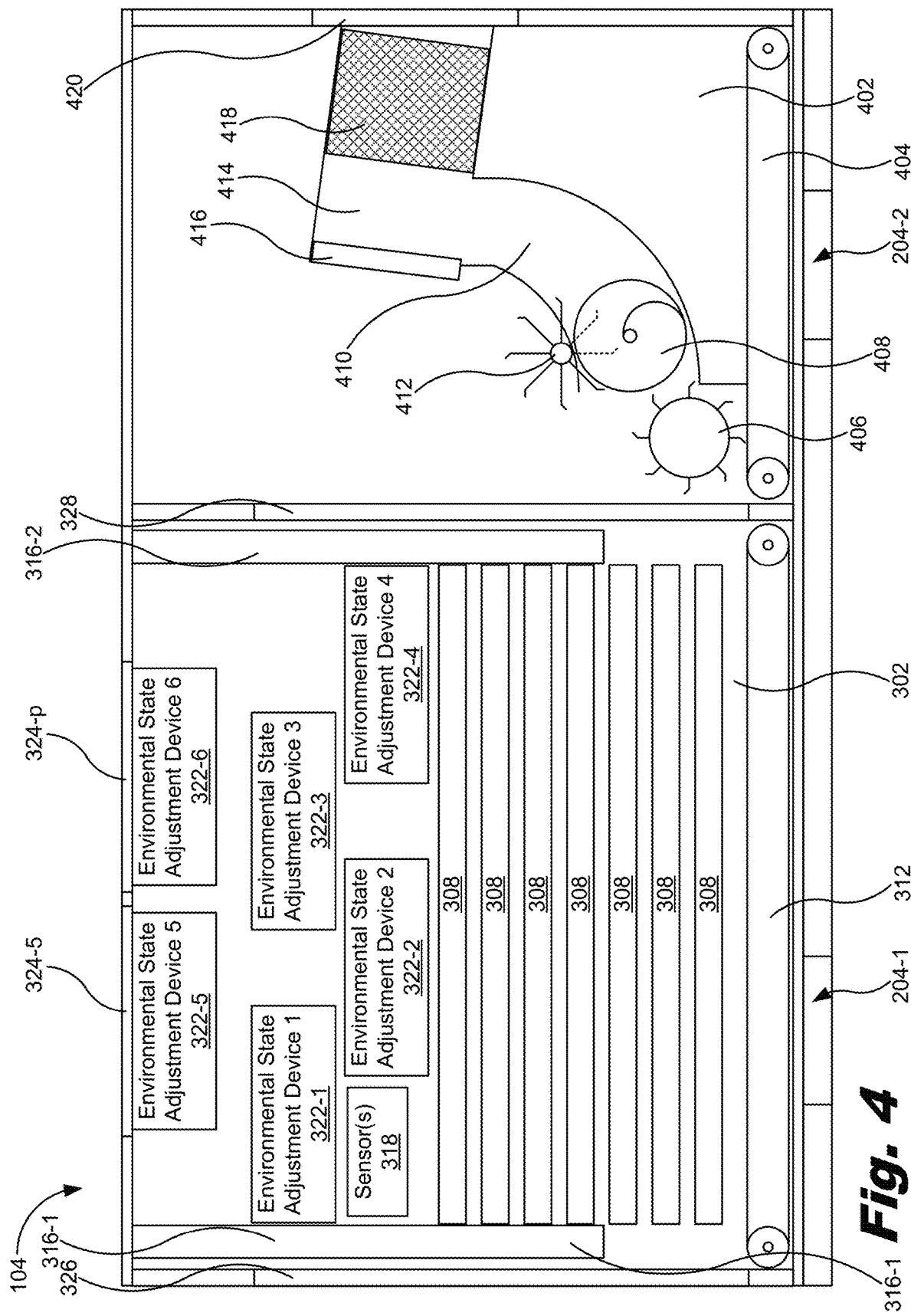
FIG. 4 is a side, cut-away schematic illustration of a modular unit for forming rectangular bales, according to an example of the principles described herein.
Figure 5:
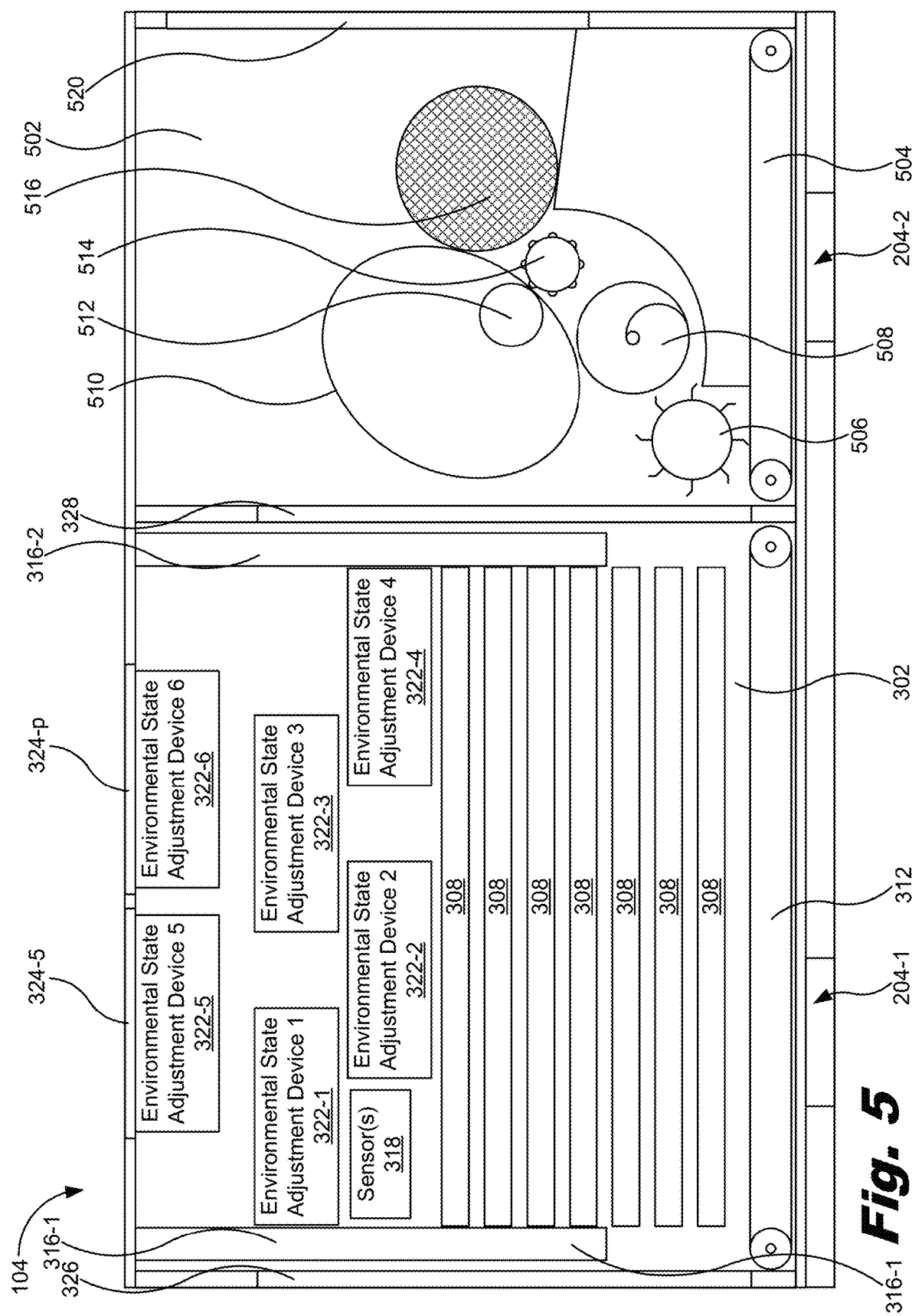
FIG. 5 is a side, cut-away schematic illustration of a modular unit for forming round bales, according to an example of the principles described herein.
Figure 6:
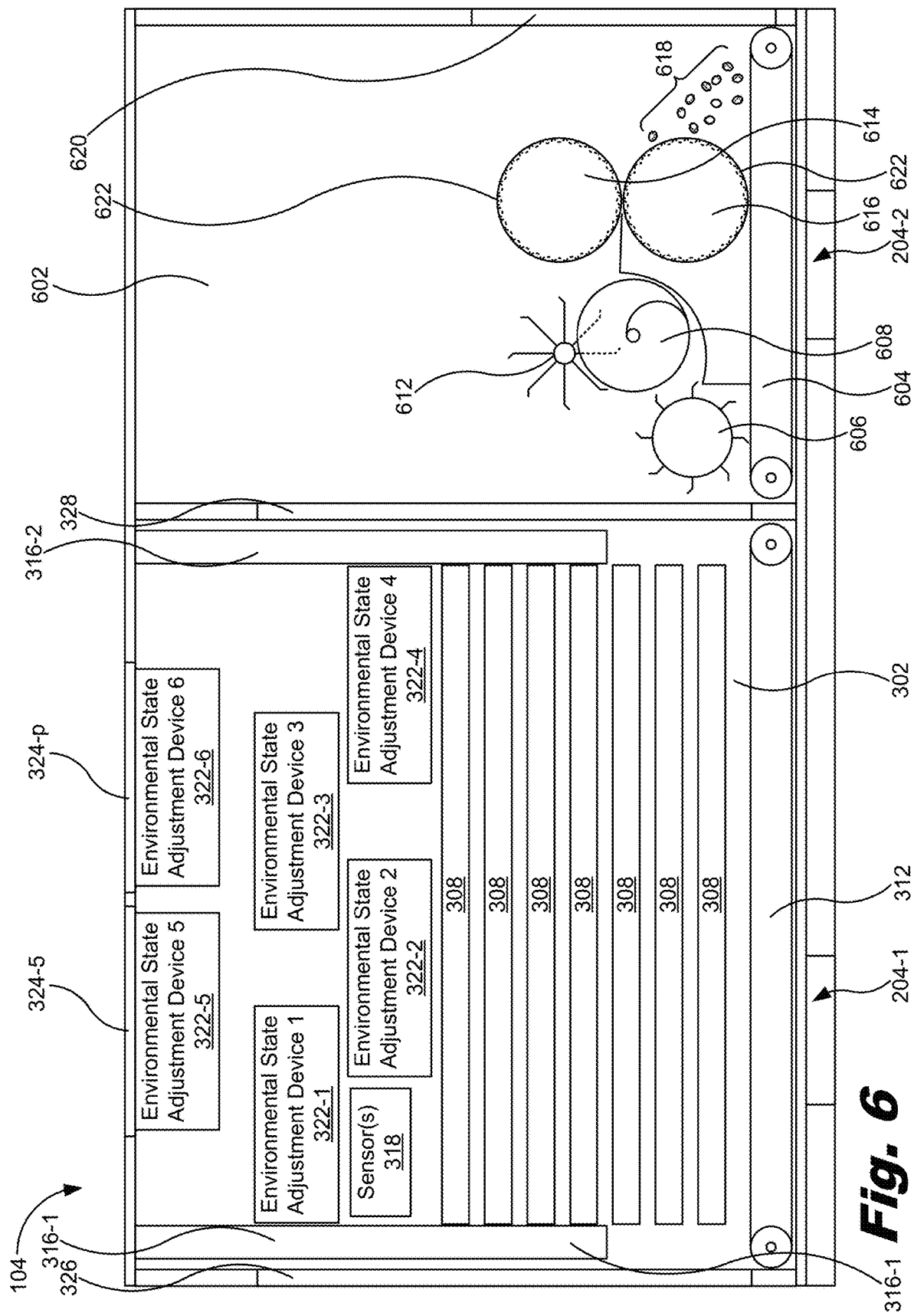
FIG. 6 is a side, cut-away schematic illustration of a modular unit for forming pellets, according to an example of the principles described herein.

FIG. 3 is a side, cut-away schematic illustration of a drying unit 302 of a modular unit 104, according to an example of the principles described herein. As the modular unit(s) 104 depicted in FIGS. 4 through 6 include the drying unit 302, FIGS. 4 through 6 will be described in connection with FIG. 3. FIG. 4 is a side, cut-away schematic illustration of the modular unit 104 for forming rectangular bales, according to an example of the principles described herein. FIG. 5 is a side, cut-away schematic illustration of the modular unit 104 for forming round bales, according to an example of the principles described herein. FIG. 6 is a side, cut-away schematic illustration of a modular unit 104 for forming pellets, according to an example of the principles described herein. The drying unit 302 serves to dry the harvested material before collection into bales, cubes, pellets, and other forms of collected units. In one example, the various elements of the drying unit 302 and collection units described herein may be coupled to the panels 132, the corner pillars 206, the top joists 208, the bottom joists 210 or other supporting structures of the modular unit 104. In one example, the various elements of the drying unit 302 and collection units described herein may be coupled to a frame (not shown) or other support structure (not shown) to support the elements described herein as being included within the modular unit(s) 104. Further, in one example, the various elements of the drying unit 302 and collection units described herein may be electrically, pneumatically, hydraulically, mechanically, and/or physically coupled to the harvester 102 so that the various elements of the drying unit 302 and collection units may be driven by the harvester 102 directly or indirectly. In one example, the modular unit(s) 104 may be electrically, pneumatically, hydraulically, mechanically, and/or physically coupled to the various elements of the drying unit 302 and collection units described herein to drive the various elements.

The drying unit 302 may include a drying system 304. The drying system 304 includes a rotating drum 306. A plurality of carriers 308 may be rotatable coupled to the rotating drum 306 via a number of respective pivots 310. In one example, the number of carriers may be between 4 and 20. In one example, the number of carriers 308 may be 6 or less. In one example, the carriers 308 may be approximately 6 feet long, or longer as needed and may be shaped like a windrow of harvested material. In one example, the carriers 308 may be punched or perforated from the top and rear of the carrier 308 at an approximately 35-45 degree downward angle towards the front of the carrier 308 in order to add additional drying capability as the carriers rotate. The direction of the punches or perforations ensure that any stems of the harvested material do not go into the carriers 308 and create a block in the harvesting system 100. The harvested material may be conveyed into the carriers 308 and conveyed within the carriers 308 to allow for the relatively wet harvested material to begin a drying process provided by the drying unit 302. The harvested material may dry as the rotating drum 306 rotates. Although the rotating drum 306 is depicted as having an elliptical shape, the rotating drum 306 may include an oblong shape, shapes that extend further into the top portion of the drying unit 302, or other shapes that allow the harvested material to be moved throughout the drying unit 302 to ensure that the harvested material dries.

The rotating drum 306 may be rotated using a track motor 314 mechanically coupled to the rotating drum 306. At least one track arm 316-1, 316-2 may be coupled between one support structure of the modular unit 104 to the track motor 314 and the rotating drum 306 with the rotating drum 306 being rotated by the track motor 314. As a drying process to dry the harvested material is begun, the rotating drum 306 rotates, and the carriers 308 rotate with the rotating drum 306. As the rotating drum 306 rotates the carriers 308 swivel and self-level via the pivots 310 to not drop the harvested material to the floor of the drying unit 302 but to ensure that the harvested material is exposed to environmental conditioning states within the drying unit to dry the harvested material as described herein.

The drying unit 302 may also include a drying unit conveyor mechanism 312 to convey the harvest material from the conditioner 114 exterior to the modular unit 104 and into the drying unit 302 for drying. In one example, the drying unit conveyor mechanism 312 may extend outside of the drying unit 302 and/or may interface with elements of the conditioner 114 to move the harvested material into the drying unit 302. In one example, a cutting device may be included within the drying unit 302 to allow for the harvested material to be cut when an amount of harvested material is introduced into the drying unit 302. In one example, a first door 326 may include a cutting device to cut the harvested material as the first door 326 closes to begin a drying process to dry the harvested material within the drying unit 302.

The harvested material may be moved into the carriers 308 through various means. In one example, the harvested material may be moved into the carriers 308 by the carriers 308 being moved to below the drying unit conveyor mechanism 312 where a void in the drying unit conveyor mechanism 312 exists. In one example, the conveyor mechanism 312 may be moved to a position approximately 8 inches above the carriers 308 in order to allow the harvested material to drop down onto the carriers 308. In one example, the harvested material may be scooped up by the carriers 308 as they pass the harvested material positioned on the drying unit conveyor mechanism 312. In one example, the carriers 308 may include a number of protrusions that act as tines or rakes to spear or hook the harvested material and carry the harvested material along the rotating drum 306.

The drying unit 302 may also include at least one sensor (s) 318 to detect at least one measurable, environmental state within the drying unit 302. Although one sensor 318 is depicted throughout the figures, any number of sensors 318 may be included within the drying unit 302 including a plurality of sensors 318 and a plurality of different types of sensors 318. The sensor 318 may include sensors such as, for example, a temperature sensor, a heat flux sensor, an infrared thermometer, a quartz thermometer, a resistance temperature detector, a silicon bandgap temperature sensor, a thermometer, a thermocouple, a thermistor, a pyrometer, a microbolometer, a humistor, a hygrometer, a barometer, a phytometric leaf sensor, a lysimeter, a phsychrometer, a Hook gauge evaporimeter, a calorimeter, a flame detector, a mass scale, a digital mass scale, a weight scale, a digital weight scale, a strain gauge, other types of sensors for measuring a number of environmental states within the drying unit 302. The control systems 128, 130 of the harvester 102 and/or the modular unit(s) 104 may activate the sensor(s) 318 to measure and determine the environmental states within the drying unit 302. More details regarding the processes of the control systems 128, 130 of the harvester 102 and/or the modular unit(s) 104 with relation to the sensor(s) 318 is provided herein.

The intent of the drying unit 302 is to (1) expose the harvested material to high temperatures to increase the amount of fluid (e.g., water) molecules from liquid to vapor; (2) cause air to move about the harvested material to carry the vapor away and prevent the air near the harvested material from becoming saturated with the vapor; and (3) create a low humidity state within the drying unit 302 so that evaporation will continue steadily and to ensure condensation of the vapor back onto the harvested material does not occur. Thus, a number of environmental states within the drying unit 302 may be measured to determine a level at which these environmental states are in. In one example, the temperature of the interior of the drying unit 302, the harvested material, surfaces within the drying unit 302, or combinations thereof may be measured by the sensor(s) 318 to determine if the temperature to which the harvested material is exposed to is conducive to evaporation of fluids from the harvested material. Further, in one example, the humidity levels within the drying unit 302 may be measured by the sensor(s) to determine if the vapor (e.g., water vapor) within the air of the drying unit 302 is below a threshold where evaporation of fluid from the harvested material may continue without the vapor condensing back onto the harvested material.

The sensor 318 may also include a mass or weight sensor to detect a mass or weight of harvested material introduced into the drying unit 302 for drying. The mass or weight sensor may determine how much of the harvested material is currently contained within the drying unit 302, how much more of the harvested material may be introduced into the drying unit 302, and/or how much of the harvested material exists within the drying unit 302 as the harvested material is removed from the drying unit 302 into the collection unit. The sensor(s) 318 may also include an object sensor to detect the presence of objects including, for example, harvested material within the drying unit 302.

Still further, a sensor 318 to detect whether combustion of the harvested material has occurred such as a flame detector may be included. The control systems may use the flame detector 128, 130 of the harvester 102 and/or the modular unit(s) 104 to activate an extinguishing system 320 to extinguish any combusting material. Although the extinguishing system 320 is depicted in the figures as being included within the drying unit 302, in one example, a plurality of extinguishing system 320 may be included in the drying unit 302, in the collection unit 402, 502, 602, and throughout the harvesting system 100 in order to safeguard the modular unit 104, the harvester 102, and the harvesting system 100. In one example, the harvesting system 100 may include a first extinguishing system 320 associated with the drying unit 302, and a second extinguishing system 320 mounted to an underside of the top panel 132-1. Other types of sensors 318 may be used to determine other environmental states as described herein. The extinguishing system 320 may be triggered to activate if and when combustion of the harvesting material occurs and to ensure safe operation of the harvesting system 100. The sensors 318 may report to the control system 130 of the modular unit 104 to sense and report moisture content within the harvested material. Based on the sensed moisture content within the harvested material, the control system 130 of the modular unit 104 and/or the control system 128 of the harvester 102 may take a number of actions including slowing and/or stopping movement of the harvesting system 100 along a surface of the field, slowing and/or stopping operation of the header 106, slowing and/or stopping activation of conveyors, slowing and/or stopping opening and closing of doors within the modular unit 104, and/or slowing and/or stopping operation of the collection unit, until drying and cooling of the harvested material is achieved.

In one example, the control system 130 of the modular unit 104 and/or the control system 128 of the harvester 102 may cause the header 106 to be lifted up from a surface of the field, and/or cause the harvester 102 to reverse its direction for a predetermined distance (e.g., approximately 3 feet) in order to ensure that standing crop 134 does not obstruct the cutting bar 110 or is not run over by the harvester 102. Once the drying unit 302 has completed its drying of the harvested material contained therein based on the feedback from the sensors 318 and activation of the environmental state adjustment devices 322, the control system 130 of the modular unit 104 and/or the control system 128 of the harvester 102 may resume operation of the harvesting system 100 as described herein.

The drying system 304, along with the sensor(s) 318 to detect the environmental state(s), includes a number of environmental state adjustment devices 322-1, 322-2, 322-3, 322-4, 322-5, 322-$m$, where m is any integer greater than or equal to 1 (collectively referred to herein as environmental state adjustment device(s) 322 unless specifically addressed otherwise). The environmental state adjustment devices 322 may include any device that is capable of adjusting at least one environmental state within the drying unit 302. In one example, the environmental state adjustment devices 322 may include a number of fans to create a flow of air from the area where the harvested material is dried (e.g., away from the drying system 304) and to an area outside the drying unit 302 and/or the modular unit 104. In order to vent the relatively more humid air inside the modular unit 104 to a position outside of the modular unit 104, a number of vent doors 324-1, 324-2, 324-3, 324-4, 324-5, 324-$p$, where p is any integer greater than or equal to 1 (collectively referred to herein as vent door(s) 324 unless specifically addressed otherwise) may be included. The vent doors 324 may be manually opened by a user and/or automatically opened via actuators that are activated by the control systems 128, 130 of the harvester 102 and/or the modular unit(s) 104 as data is collected by the sensor(s) 318 that define a humidity level above a predetermined threshold, for example. In one example where the environmental state adjustment devices 322 include fans, the revolutions per minute (rpms) of the fans may be increased or decreased individually and/or collectively, or may be stopped and/or reversed in rotational direction individually and/or collectively, to allow for air ambient to the modular unit 104 to be introduced into the drying unit 302 and/or allow for air internal to the drying unit 302 of the modular unit 104 to be exhausted to the outside of the modular unit 104. In this manner, different currents of air (e.g., clockwise or counter clockwise) may be produced. In one example, the direction of rotation of the fans may be cycled or changed any number of instances during a drying process. In one example, the environmental state adjustment devices 322 may be offset from one another along exterior surfaces of the drying unit so that the environmental state adjustment devices 322 do not interfere with individual air currents produced.

In one example, the environmental state adjustment devices 322 may also include a dehumidifier to reduce and maintain a predetermined level of humidity in the air within the modular unit 104 and/or to prevent and/or eliminate growth of mildew by extracting water or other fluids from the air. Still further, the environmental state adjustment devices 322 may also include a cooling device such as an air conditioner that may remove heat and moisture from the interior areas of the modular unit 104 to the ambient areas outside the modular unit. Other environmental state adjustment devices 322 may be included within the modular unit 104 to cause a predetermined level or threshold of one or more environmental states within the drying unit 302 of the modular unit 104.

In operation, the drying unit 302 may accept the harvested material from the harvester 102 including the header 106 and conditioner 114 through a first door 326. The first door 326 may be manually opened by a user and/or automatically opened via actuators that are activated by the control systems 128, 130 of the harvester 102 and/or the modular unit(s) 104 as data is collected by the sensor(s) 318. For example, the sensor(s) 318 may detect a lack of harvested material being dried in the drying unit 302. In instances where no harvested material is located within the drying unit 302 or an amount of harvested material is below a threshold, the first door 326 may be opened to allow more harvested material to enter the drying unit 302. The drying unit conveyor mechanism 312 may be activated to convey the harvest material from the conditioner 114 exterior to the modular unit 104 and into the drying unit 302 for drying.

Once a predetermined volume or weight of the harvested material is present within the drying unit 302, drying of the harvested material may take place. The rotating drum 306 of the drying system 304 may be activated to cause the carriers 308 to capture the harvested material and begin to move the harvested material within the drying unit 302. In this manner, the harvested material is exposed to air flows within the drying unit 302 and is agitated such that different surfaces of the harvested material are exposed to the flow of air.

As the drying system 304 operates, the sensor(s) 318 may detect temperatures, levels of humidity, weights, and other environmental states within the drying unit 302 and within the harvested material. Data obtained from the sensor(s) 318 is used by the control systems 128, 130 of the harvester 102 and/or the modular unit(s) 104 to determine how to operate the environmental state adjustment device(s) 322. For example, detection of too high of a temperature above a threshold or too high of a level of humidity above a threshold, the environmental state adjustment device(s) 322 may be activated by the control systems 128, 130 of the harvester 102 and/or the modular unit(s) 104 to bring the environmental state within the drying unit 302 to a state where the fluids or moisture within the harvested material may most effectively evaporate and dry out the harvested material. During activation of the environmental state adjustment device(s) 322, one or more of the vent door(s) 324 may be opened to allow the moisture to vent out of the drying unit 302 as described herein.

In one example, the sensor(s) 318 may determine whether the harvested material is dry above a threshold. Once the sensor(s) 318 determine that the harvested material is dry above the threshold, the sensor(s) 318 may determine a temperature of the harvested material to determine if the harvested material is above a threshold (e.g., the harvested material is too hot) for collection into bales, cubes, and/or pellets. If it is determined that the temperature of the harvested material is above the threshold, the environmental state adjustment device(s) 322 may provide cooler, unheated air to be circulated prior to moving the harvested material into the collection units described herein. By cooling the harvested material before collection by the collection unit, the risk of spontaneous combustion is significantly reduced.

Once the sensor(s) 318 determine that the harvested material is dried to a predetermined level based on the detected environmental states, the control systems 128, a second door 328 may be manually opened by a user and/or automatically opened via actuators that are activated by the control systems 128, 130 of the harvester 102 and/or the modular unit(s) 104 to allow the dried, harvested material to be moved from the drying unit 302 to a collection unit 402, 502, 602 as depicted in FIGS. 4 through 6. The drying unit conveyor mechanism 312 and/or a collection unit conveyor mechanism 404 may be activated to assist in moving the harvested material. In one example, in order to off-load the harvested material from the carriers 308, the carriers 308 may be turned about their respective pivots 310 when, for example, the carriers 308 near the bottom of the drying unit 302. The carriers 308 may all perform this off-loading process in turn. The door to the collection unit 402, 502, 602 may be opened during emptying of a first one of the carriers 308, and the conveyer systems and/or the collection unit 402, 502, 602 may resume operation in order to avoid creating an obstruction from too much harvested material at one time attempting to enter the collection unit 402, 502, 602. Once all the carriers 398 are emptied, the first door 326 of the drying unit 302 may also be open to expel the dried, harvested material out the second door 328 and to allow undried, harvested material to enter the drying unit 302 via the first door 326. As the undried, harvested material enters the drying unit 302 via the first door 326, the harvester 102 may proceed to harvest additional standing crop 134 to fill the drying unit 302 and the carriers 308.

The collection units 402, 502, 602 of FIGS. 4 through 6 will now be described in more detail as their respective functions differ in the manner in which they collect and package the dried, harvested material. It is noted that although certain types of collection unit 402, 502, 602 are described in connection with FIGS. 4 through 6, any type of collection unit may be employed including, for example, a baler that creates a small rectangular bale, a baler that creates a second size of a rectangular bale, a baler that creates a third size of a rectangular bale, a baler that may create at least two sizes of round bales, a pelletizer that creates cylindrical pellets, a cuber that creates hay cubes, and other types of collection units.

Further, the various collection units 402, 502, 602 described herein may include any number of dispensing devices. For example, a baler that creates small rectangular bales may include a pull behind gatherer that collects individual small rectangular bales before dropping the small rectangular bales to the ground outside the modular unit 104 to allow a plurality of the small rectangular bales to be dropped together. The larger rectangular balers and round balers may also include exit platforms and/or angled tailgates to all the larger rectangle and round bales to assist the bales to the ground after exiting the modular unit 104. These dispensing devices assist in allowing the bales to fall to the ground while reducing an amount of plant matter such as leaves and grain from becoming dislodged from the bales, in the case of the round bales it will also assist in preventing them from rolling if they were just dropped out of the baler. In one example, the control systems 128, 130 of the harvester 102 and/or the modular unit(s) 104 may execute instructions stored in memory that define drying times, collection times, and field speeds for each of the different types of modular unit(s) 104 so that the harvesting system 100 may allow for any backup of the harvested material within the harvester 102 and/or the modular unit 104. In this manner, the control systems 128, 130 of the harvester 102 and/or the modular unit(s) 104 and provide different drying times, collection times, and field speeds for each of the different types of modular unit(s) 104.

Once the bales are deposited throughout the field, a bale wagons or other equipment may immediately load the bales and transport the bales to a storage facility such as a barn. This allows for the user to operate the harvester 102 at different angles or directions. Because the systems and methods described herein allow for the bales deposited by the modular unit(s) 104 to be transported from the field immediately after harvesting and processing through the harvesting system 100, the direction of harvesting the standing crop 134 may be chosen by the user. Allowing for the user to choose the direction of harvesting ensures that the user can take into account any directional bends of the standing crop 134. In one example, coordinates collected via, for example, a global positioning system (GPS) of how the field was harvested may be stored in memory, and may assist in deciding a direction to harvest a next crop. Thus, the user may be able to cleanly cut the field during a next cutting of the standing crop 134. Further, because the systems and methods described herein allow for the bales deposited by the modular unit(s) 104 to be transported from the field immediately after harvesting and processing through the harvesting system 100, the harvested material remains dry if, during harvesting, it should begin to precipitate, or it precipitates during maintenance of the harvester 102, the user wishes to cease harvesting for a given period, or for other reasons. The harvesting system 100 eliminates the chance that unbaled harvested material is left in the field to be precipitated on, bleached, and/or drained of nutrients.

Further, in one example, the control systems 128, 130 of the harvester 102 and/or the modular unit(s) 104 may execute instructions stored in memory that define drying times, collection times, and field speeds for each of the different types of standing crop 134 that is to be harvested. For example, a consistent product may be determined, and parameters used to harvest the standing crop 134 and condition, dry, and collect the harvested material for each type module may be stored in memory and executed by the control systems 128, 130. In this example, a user may define a desired moisture level to be obtained within the different types of standing crop 134 that may be harvested using the harvesting system 100. For example, alfalfa may contain approximately 50% moisture by weight when cut, whereas other crops such as hay grass may have a relatively lower moisture content. The control systems 128, 130 may store such data, and operate the various elements of the harvesting system 100 accordingly to achieve a desired moisture level such as, for example, a 30% to 35% moisture level to ensure that the crop does not fall apart but includes a relatively lower moisture level to ensure that mold and spontaneous combustion issues do not arise.

In one example, the drying unit 302 may further include an auger to move the harvested material throughout the drying unit 302. In one example, the auger may assist in moving the harvested material from the first door 326 to the drying system 304 to engage with the drying system 304. Further, in one example, the auger may assist in moving the harvested material from the sides of the drying unit 302 to engage with the drying system 304.

FIG. 4 is a side, cut-away schematic illustration of a modular unit 104 for forming rectangular bales 418, according to an example of the principles described herein. The collection unit 402 of FIG. 4 includes a first picker 406 to, when activated, pick the dried, harvested material from the drying unit conveyor mechanism 312 and/or a collection unit conveyor mechanism 404 and place the harvested material adjacent an auger 408. The auger 408 causes the harvested material to be drawn to a center of the collection unit 402 in preparation for the harvested material to be moved through a chute 410. The chute 410 may be dimensioned such that it is approximately as wide as a bale of harvested material. A second picker 412 assists in the movement of the harvested material up into the chute 410. As the harvested material moves through the chute 410, the harvested material is placed within a packing chamber 414, where a packing block 416 may pack the harvested material into the bale 418. The packing block 416 may move in the direction toward the bale and past the packing chamber via, for example, a pneumatic, hydraulic, or mechanical piston or ramrod (not shown). Although not depicted, baling twine or other elements used to bind the harvested material together into the bale may be applied to the bale. Once a bale 418 has been created by the collection unit 402, a third door 420 may be manually opened by a user and/or automatically opened via actuators that are activated by the control systems 128, 130 of the harvester 102 and/or the modular unit(s) 104 to allow the bale to exit the collection unit 402 of the modular unit 104. Once the bale exits the modular unit 104, it may be allowed to drop to the surface of the field from which the standing crop 134 was harvested for later gathering or may be conveyed into a trailer or separate equipment for transport away from the field. Other arrangements of elements within the collection unit 402 of FIG. 4 may be used to accomplish the collection of the dried, harvested material into a rectangular bale 418.

In the example of FIG. 4 and throughout the examples of the modular units 104 described herein, a spring device may be included in the collection units 402 on, for example, the fourth side panel 132-5, the four side panels 132-2, 132-3, 132-4, 132-5, the corner pillar 206, the top joists 208, the as bottom joists 210, or other elements of the modular unit 104. The spring device may allow for approximately 3 t0 6 inches of shift of the collection unit separate from the modular unit such that the force applied by the packing block 416 may be alleviated. In other words, during the collection process performed by, for example, the collection unit 402 of FIG. 4, the rear force may be enough to stop the forward movement of the harvester 102 in some instances. Thus, the spring device may reduce or eliminate any disruptive force applied by the packing block 416 on the harvester 102 without restricting the baler from packing a quality bale.

FIG. 5 is a side, cut-away schematic illustration of a modular unit 104 for forming round bales 516, according to an example of the principles described herein. The collection unit 502 of FIG. 5 includes a picker 506 to, when activated, pick the dried, harvested material from the drying unit conveyor mechanism 312 and/or a collection unit conveyor mechanism 504 and place the harvested material adjacent an auger 508. The auger 508 causes the harvested material to be drawn to a center of the collection unit 502 in preparation for the harvested material to be moved through a pair of rollers. As the harvested material passes the auger 508, a belt 510 captures the harvested material and moves the harvested material between a first roller 512 and a second roller 514 where the harvested material is flattened and arranged in a plane or flattened layer. The belt 510 continues to move the flattened harvested material toward a collection area where the round bale 516 is turning as more layers of the flattened harvested material is collected onto the round bale 516. In this manner, a continuous layer of flattened harvested material is added to the round bale 516 until the round bale 516 grows to a desired size (e.g., diameter or weight). Once the round bale 516 has been created by the collection unit 502, the round bales may then be twine tied, and/or wrapped in netting or plastic, and a third door 520 may be manually opened by a user and/or automatically opened via actuators that are activated by the control systems 128, 130 of the harvester 102 and/or the modular unit(s) 104 to allow the round bale 516 to exit the collection unit 502 of the modular unit 104. Once the round bale 516 exits the modular unit 104, it may be allowed to drop to the surface of the field from which the standing crop 134 was harvested for later gathering or may be conveyed into a trailer or separate equipment for transport away from the field. Other arrangements of elements within the collection unit 502 of FIG. 5 may be used to accomplish the collection of the dried, harvested material into the round bales 516.

FIG. 6 is a side, cut-away schematic illustration of a modular unit 104 for forming pellets 618, according to an example of the principles described herein. The collection unit 602 of FIG. 6 includes a first picker 606 to, when activated, pick the dried, harvested material from the drying unit conveyor mechanism 312 and/or a collection unit conveyor mechanism 604 and place the harvested material adjacent an auger 608. The auger 608 causes the harvested material to be drawn to a center of the collection unit 602 in preparation for the harvested material to be moved through a pair of die rollers. As the harvested material interfaces with the auger 608, a second picker 612 assists in the movement of the harvested material up a first die roller 614 and a second die roller 616. The first die roller 614 and the second die roller 616 include a plurality of dies 622 formed in the die rollers 614, 616. In one example, the die rollers 614, 616 are brought into a pressurized interface with one another to compress or mold the harvested material into the shape defined by the dies 622. Thus, the harvested material is introduced to the die rollers 614, 616 by the auger 608 and the second picker 612, and forced between the die rollers 614, 616. The force between the die rollers 614, 616 causes the harvested material to move into the dies 622 and form a number of pellets 618. The pellets 618 match a shape as defined by the dies 622, and the shape may include, for example, cylindrical shapes, oval shapes, square shapes, cube shapes, and circle shapes, among any other shape as defined by the dies 622. Once the pellets 618 have been created by the collection unit 602, a third door 620 may be manually opened by a user and/or automatically opened via actuators that are activated by the control systems 128, 130 of the harvester 102 and/or the modular unit(s) 104 to allow the pellets 618 to exit the collection unit 602 of the modular unit 104. Once the pellets 618 exit the modular unit 104, the pellets 618 may be conveyed into a trailer or separate equipment for transport away from the field. In one example, a containment bin may be included on the rear of the module unit 104 into which the pellets 618 may be dispensed. Once full, the pellets 618 within the containment unit may be augured to a pull behind wagon. In one example, a bale out wagon may be pulled up by the harvester 102 to off-load the module unit 104 or the containment unit. Other arrangements of elements within the collection unit 602 of FIG. 6 may be used to accomplish the collection of the dried, harvested material into the pellets 618.

In the example of FIG. 6, the pellets 618 formed by the collection unit 602 when straw is harvested it may be used for a variety of purposes including feed for animals, ground covering for livestock such as in stalls (e.g., as well as when in baled form), and as fuel pellets which may be burned as a form energy. In the case of using the pellets as fuel for burning, the pellets may be mixed with, for example, wood pellets in order to reduce an amount of wood pellets used in a given application and to reduce emissions associated with the burning of wood pellets. In this manner, Because the pellets 618 may be a renewable resource, natural resources are benefitted.

The different types of modular units 104 described in connection with FIGS. 4 through 6 allow for a user such as a farmer to economically obtain equipment in the form of the harvester 102 and the various modular unit(s) 104 that also allow the user to obtain the harvested material in a variety of different configurations including, for example, at least three sizes of rectangular bales or at least two sizes of round bales, pellets and cubes of various shapes. The modularity of the modular unit(s) 104 allows for the user to quickly and easily change a desired output when harvesting a field of standing crop 134. Further, because each of the modular unit(s) 104 described in FIGS. 4 through 6 provide for a drying unit 302 that effectively dries the harvested material before collection by the collection units 402, 502, 602, use of any of the modular unit(s) 104 results in a product that is fully harvested, dried, and collected without the potential loss in product that may result from leaving a harvested crop in the field for drying. Thus, in a single pass of the harvesting system 100, the standing crop 134 is harvested, dried, collected, and stored (e.g. "put up").

Although the drying units 302 of the modular unit(s) 104 are described herein to include a drying system 304, other drying devices and methods may be employed to dry the harvested material. In one example, the drying unit 302 may include a dehydration system, fans, a convection air dryer or a warm air dryer being cycled in and out of the modular unit(s) 104, or combinations thereof that operate while the harvested material is rotated using augers, hay rotators, the drying system 304, and combinations thereof.

Figure 7:
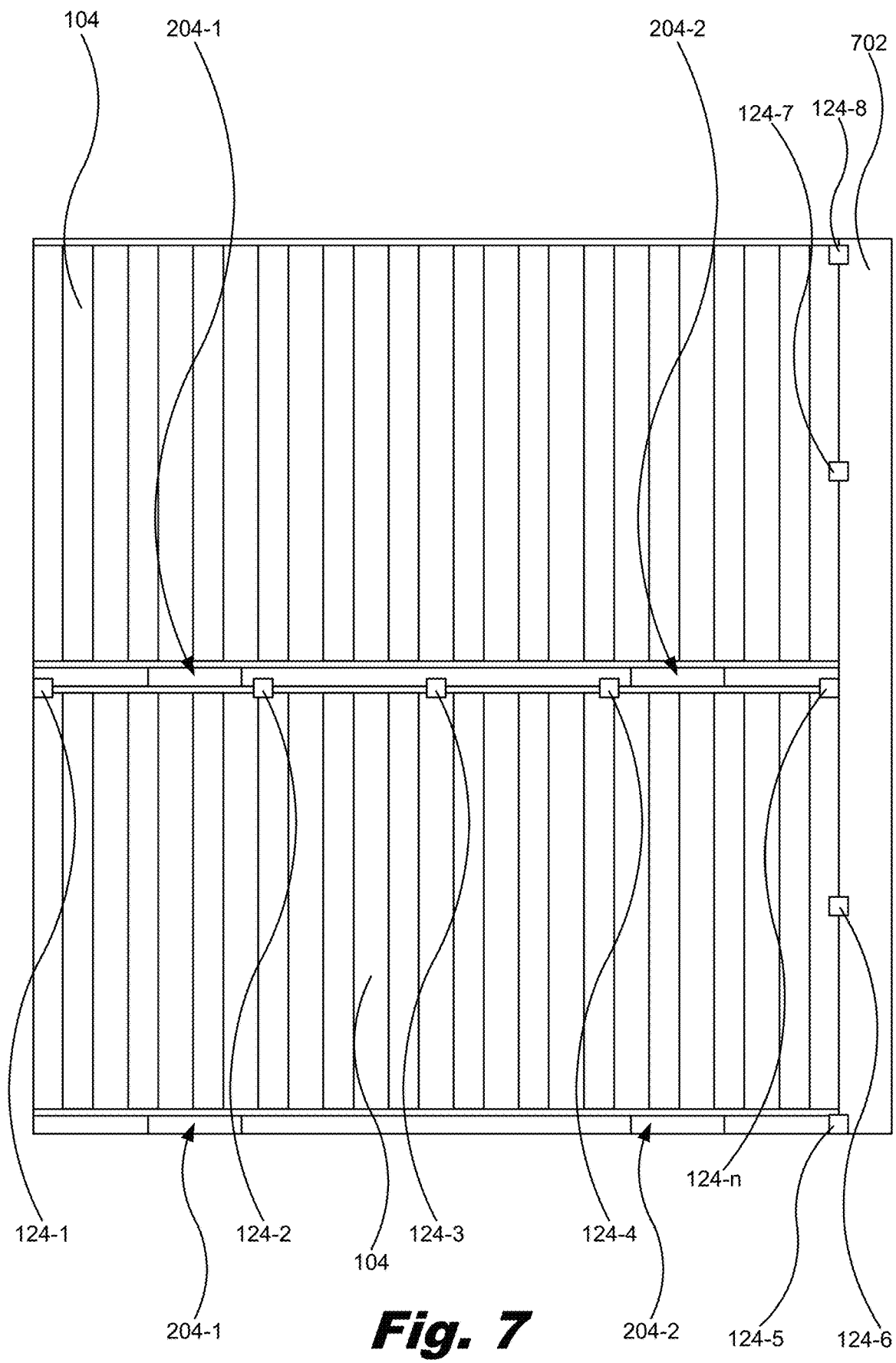
FIG. 7 is a side schematic illustration of two of the modular units coupled to one another, according to an example of the principles described herein.

FIG. 7 is a side schematic illustration of two of the modular unit(s) 104 coupled to one another, according to an example of the principles described herein. FIG. 7 will be described in connection with FIG. 1 to discuss the manner in which the modular unit(s) 104 are coupled to the platform 120 and the bulkhead 122 of the harvester 102 during use of the modular unit(s) 104 in connection with the harvest of the standing crop 134 as well as to discuss the manner in which the modular unit(s) 104 are coupled to one another in connection with stacking and storing the modular unit(s) 104.

As mentioned above, a number of mechanical coupling devices 124 may be used to couple the modular unit(s) 104 to the harvester 102 and to one another. In one example, as mentioned above, the mechanical coupling devices 124 may include male twist locks. As described above, the modular unit(s) 104 includes twist lock corner castings 212 that serve as a female portion to which the mechanical coupling devices 124 (also referred to herein as male twist locks) may couple. Further, similar female recesses formed in the twist lock corner castings 212 may also be formed in the platform 120 and the bulkhead 122 of the harvester 102. With this understanding, the modular unit 104 may be coupled to the platform 120 and the bulkhead 122 by coupling the male twist locks 124 to the twist lock corner castings 212 of the modular unit 104 and the female recesses formed in the platform 120 and the bulkhead 122. In this manner, the architecture of the modular unit 104 (e.g., an intermodal shipping container) that already exists including the twist lock corner castings 212 may be used to secure the modular unit 104 to the harvester 102.

As depicted in FIG. 7, the male twist locks 124 may also be used to couple a plurality of modular unit(s) 104 together. Intermodal shipping containers, when being transported via, for example, a shipping vessel, are coupled in large stacks using the male twist locks 124. Similarly, the modular unit(s) 104 may be coupled together using the male twist locks 124.

In one example, the modular units 104 may also be coupled to a wall 702 or other structure for storage during an off season or when otherwise not in use. In this example, the modular units 104 are coupled to the wall 702 or other structure using a number of the mechanical coupling devices such as the male twist locks 124-5, 124-6, 124-7, 124-8 and a corresponding number of recesses formed in the wall 702 that are similar to the recesses of the twist lock corner castings 212. In this manner, the modular unit(s) 104 may be stacked and coupled to one another and collectively supported as a group of a plurality of modular unit(s) 104. Further, in this manner, coupling the modular units 104 to the wall 702 or other structure further supports the coupled modular unit(s) 104 from toppling over.

In one example, the panels 132 of the modular unit(s) 104 may be convex such that an exterior of the panels 132 extend away from an interior of the modular unit 104. The convex side panels 132 provide for the modular unit(s) 104 to withstand high winds and precipitation (e.g., rain or snow) that may fall on the modular unit(s) 104. Further, the convex side panels 132 allow the precipitation that may otherwise fall on the modular unit(s) 104 to slide or shed off of the modular unit(s) 104. This results in less wear on the side panels 132 that may occur from standing water such as rusting or other forms of environmental damage.

Figure 8:
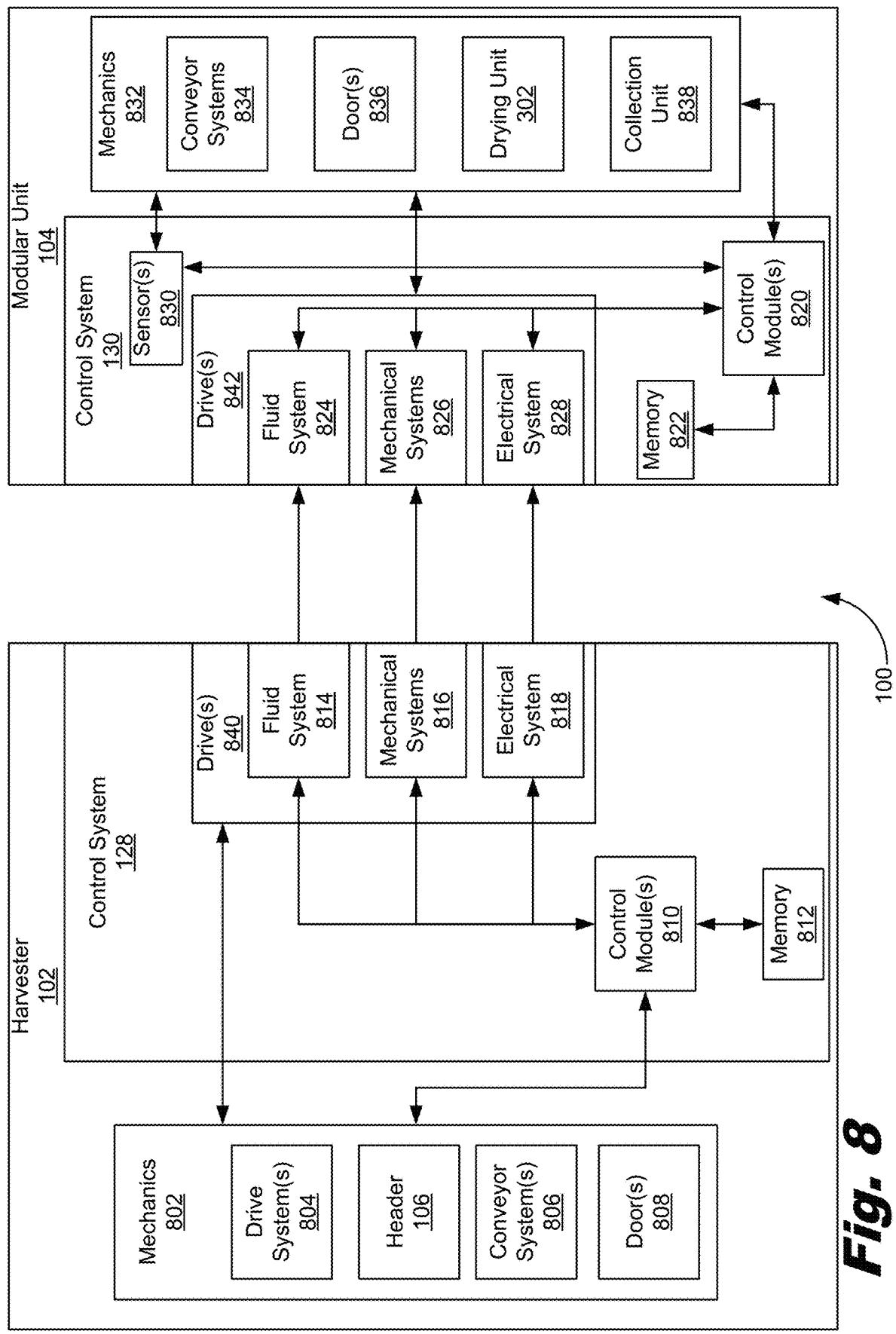
FIG. 8 is a block diagram of the harvesting system of FIG. 1 according to an example of the principles described herein.

FIG. 8 is a block diagram of the harvesting system 100 of FIG. 1 according to an example of the principles described herein. The harvesting system 100 includes the harvester 102 and the modular unit 104. Further, the harvester 102 includes the control system 128 and the modular unit 104 includes the control system 130 as described herein. In one example, the control systems 128, 130 may work in concert with each other in bringing about the functions of the harvesting system 100. In one example, the control systems 128, 130 may work independent of one another bringing about the functions of the harvesting system 100.

The control system 128 of the harvester 102 is communicatively and physically coupled to the mechanics 802 of the harvester 102 in order to control at least one function of the mechanics 802. The mechanics 802 may include, a number of drive system(s) 804. The drive system(s) 804 may include, for example, acceleration systems, braking systems, steering systems, geo-positioning systems, autonomous driving systems, and other systems used in any manner to cause or assist the harvester to move. For example, the drive system 804 may be any and all devices and systems that allow for a user to move the harvester 102 during the harvesting of the standing crop 134. Movement of the harvester 102 via activation of the drive system(s) 804 may be performed autonomously via instructions received from the control module(s) 810, partially autonomously, or via input from a user, and combinations thereof.

The mechanics 802 may also include the header 106 used to harvest the standing crop 134 as described herein. The control module(s) 810 may instruct the header 106 to activate. In one example, when the header 106 is activated, the harvester 102 may also activate the conditioner 114. Further, the mechanics 802 may include a number of conveyor system(s) 806 that move the harvested material from the header 106 (including the conditioner 114) to the modular unit 104. Still further, a number of door(s) 808 may be included in the mechanics 802. The door(s) 808 may be opened to provide the harvested material between the various elements of the harvester 102 and between the harvester 102 and the modular unit 104. In one example, a number of actuators may be coupled to the door(s) 808 to, when activated by, for example, the control module(s) 810, open and close the door(s) 808. In one example, the door(s) described herein including doors 326, 328, 420, 520, 620, 808, and 836 may be hinged coupled to the modular unit 104 such that they swing into or out from the modular unit(s). Further, in one example, there may not exist rear doors on the module units 104. In another example, the door(s) 326, 328, 420, 520, 620, 808, and 836 described herein may be translating coupled to the modular unit 104 such that the door(s) move up and down along a vertical plane of a side or division within the modular unit(s) 104 in order to not obstruct operation of the various elements of the modular unit 104 and to not obstruct harvested material moving into, within, and out from the modular unit 104.

The devices of the mechanics 802 of the harvester 102 and the mechanics 832 of the modular unit 104 may be driven using the drives(s) 840 included as part of the harvester 102 and the drive(s) 842 included as part of the modular unit 104, respectively. The drive(s) 840, 842 may include a fluid system 814, a number of mechanical system(s) 816, and/or an electrical system 818. The fluid system 814 of the harvester 102 and the fluid system 824 of the modular unit 104 may include any system that utilizes compression of a fluid such as, for example, a gas or a liquid, to bring about transmission of power such as to provide mechanical movement. The fluid system 814 of the harvester 102 and the fluid system 824 of the modular unit 104 may include any combination of pneumatic motors, hydraulic motors, cylinders, pistons, rods, fittings, hoses, reservoirs, accumulators, compressors, amplifiers, actuators, and other hydraulic and pneumatic devices to assist in the movement of the mechanics 802 of the harvester 102 and the mechanics 832 of the modular unit 104. The fluid system of the harvester 102 may be fluidically coupled to the fluid system 824 of the modular unit 104 to provide power to the fluid system 824 of the modular unit 104. In one example, the harvester 102 may include a number of fluid system motors that are, in turn, powered by an engine (not shown) of the harvester 102. In one example, the fluid systems for the harvester 102 and the module unit 104 may be self-contained such that the fluids are not lost or leaked from the fluid systems. Further, the fluid systems may be routed within portions of the harvester 102 and the modular unit 104 such that the pneumatic motors, hydraulic motors, cylinders, pistons, rods, fittings, hoses, reservoirs, accumulators, compressors, amplifiers, actuators, and other hydraulic and pneumatic devices are accessible for coupling, repairing, and cleaning. In this example, the power supplied by the harvester 102 via, for example, a diesel engine, fuel cells or other power systems may be utilized to power the fluid system 824 of the modular unit 104. In one example, the modular unit 104 may include a power source to power the fluid system 824 and the mechanics 832 of the modular unit 104 independent of or in addition to fluid system power provided via the harvester 102.

The drive(s) 840 of the harvester 102 and the drives(s) 842 of the modular unit 104 may include respective mechanical systems 816, 826 that may be used to drive the elements of the harvester 102 and the modular unit 104. The mechanical systems 816, 826 may include, for example, a power takeoff (PTO), clutches gears, differentials, and other mechanical devices that may drive or power the functional elements of the harvester 102 and the modular unit 104. In one example, the mechanical systems 816 of the harvester 102 may be driven by a motor (not shown) of the harvester 102. Further, the mechanical systems 816 of the harvester 102 may mechanically couple with and drive the mechanical systems 826 of the modular unit 104. In one example, the harvester 102 may include a PTO as a mechanical system 816, and the modular unit 104 may include as part of its mechanical systems 826 a mating accessory drive shaft for mechanically driving the mechanics 832 or other devices of the modular unit 104. In one example, the modular unit 104 may include a power source to power the mechanical systems 826 and the mechanics 832 of the modular unit 104 independent of or in addition to mechanical power provided via the harvester 102.

The drive(s) 840 of the harvester 102 and the drives(s) 842 of the modular unit 104 may include respective electrical systems 818, 828 to power the harvester 102, the modular unit 104, and their respective devices. The electrical systems 818, 828, may include any wiring, circuits, batteries, alternators, and other electrical devices that may be used to drive or power the elements of the harvester 102 and the modular unit 104. In one example, the electrical system 818 of the harvester 102 may include a battery, alternator or similar power source. In this example, the battery or alternator may be powered by an engine (not shown) of the harvester 102, and the electrical system 818 of the harvester 102 may be electrically coupled to the electrical system 828 of the modular unit 104 to provide electrical power to the modular unit 104 and its devices. In one example, the modular unit 104 may include an electrical power source to power the electrical system and the mechanics 832 of the modular unit 104 independent of or in addition to electrical power provided via the harvester 102.

The mechanics 832 of the modular unit 104 may further include conveyor systems 834 used to move the harvested material from the harvester 102, into the modular unit 104, into the drying unit 302, from the drying unit 302 into the collection unit 838, and/or out of the collection unit 838 and modular unit 104.

Similar to the door(s) 808 of the mechanics 802 of the harvester, 802, the mechanics 832 of the modular unit 104 may also include a number of door(s) 836. In one example, the modular unit 104 may include the first door 326 where the harvested material may enter the drying unit 302 of the modular unit 104. Further, the modular unit 104 may include the second door 328 separating the drying unit 302 and the collection units 402, 502, 602. Still further the modular unit 104 may include the third door 420, 520, 620 as depicted in FIGS. 4, 5, and 6, respectively, that opens from the collection units 402, 502, 602 where the collected, harvested material exits the modular unit 104. In one example, a number of actuators may be coupled to the door(s) 836 to, when activated by, for example, the control module(s) 820, open and close the door(s) 836.

The mechanics 832 of the modular unit 104 may also include the drying unit 302 and the collection unit 838 as described herein. The drying unit 302, includes the sensor(s) 318, the environmental state adjustment device(s) 322, the extinguishing system 320, and the drying system 304. The collection unit 838 of FIG. 8 may include any one of the collection units 402, 502, 602 depicted and described in connection with FIGS. 4, 5, and 6 among other types of collection units described herein.

The control system 128 of the harvester 102 and the control system 130 of the modular unit 104 may include a number of control module(s) 810, 820. The control module(s) 810, 820 may include, for example, processors, application specific integrated circuits (ASIC), field programmable gate arrays (FPGA), systems on a chip, and other processing devices.

Memory 812, 822 may include any computer-readable media, and may take the form of volatile memory, such as random-access memory (RAM) and/or non-volatile memory, such as read only memory (ROM) or flash RAM. The computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

The control module(s) 810, 820 may instruct the mechanics 802, 832 and the drives 840 to function as described herein. The control module(s) 810, 820 are communicatively coupled to the drive(s) 840, 842 and mechanics 802, 832 to instruct the elements thereof to perform their respective functions as described herein. Further, the drive(s) 840, 842 are electrically, pneumatically, hydraulically, mechanically, and/or physically coupled to their respective mechanics 802, 832 to provide power to the mechanics 802, 832 as described herein.

Further, the control module(s) 810, 820 may include the hardware architecture to retrieve executable code from the memory 812, 822 and execute the executable code. The executable code may, when executed by the control module (s) 810, 820 cause the control module(s) 810, 820 to implement at least the functionality of the harvester 102 and the modular unit(s) 104, according to the methods described herein. In the course of executing code, the control module (s) 810, 820 may receive input from and provide output to a number of the remaining hardware units.

The control module(s) 820 of the modular unit 104 are also communicatively coupled to a number of sensor(s) 830. The sensor(s) 830 may include any of those sensor(s) 318 depicted and described in connection with FIGS. 3 through 6. The control module(s) 820 may activate the sensor(s) 830 in order to detect at least one environmental state within the drying unit 302. In one example, the control module(s) 820 may activate the sensor(s) 830 when triggered by an action such as, for example, during the introduction of harvested material into the drying unit 302, activation of the drying system 304, during operation of the drying unit 302), during the movement of the harvested material from the drying unit 302 to the collection units 838, among other triggering events. In one example, the control module(s) 820 may activate the sensor(s) 830 at predetermined intervals, continually throughout the operation of the drying unit 302, at other predetermined times, and combinations thereof.

The sensor(s) 830 may communicate data representing the environmental state within the drying unit 302 to the control module(s) 820. Once received, the data representing the environmental state within the drying unit 302 is used by the control module(s) 820 to activate the drying system 304, environmental state adjustment device(s) 322, and/or the extinguishing system 320.

The modular unit 104 may be coupled to the harvester 102, and at least one of the fluid systems 814, 824 the mechanical systems 816, 826, and the electrical systems 818, 828 may be coupled together to provide power and functionality to the modular unit 104. Further, the control module(s) 810 of the harvester 102 may be communicatively coupled to the control module(s) 820 of the modular unit 104 such that the two control module(s) 810, 820 are able to coordinate operations and functions of the harvesting system 100 as the harvesting system 100 is operated. For example, the control module(s) 810 of the harvester 102 may communicate data regarding an instances of harvested material being prepared to enter the drying unit 302 of the modular unit 104 to the control module(s) 820 of the modular unit 104 to inform the control module(s) 820 of the modular unit 104 of when to activate the first door 326, and/or any of the elements of the drying unit 302 in order to being drying of the harvested material.

In one example, the control module(s) 810, 820 may report to one another the progress of operations being performed in the harvester 102 and the modular unit 104 and communicate a number of states of operation of the harvester 102 and the modular unit 104. In one example, the control module(s) 820 of the modular unit 104 may provide an indication to the control module(s) 810 of the harvester 102 as to how close an amount of harvested material is to being dried so that the control module(s) 810 of the harvester 102 may determine how much of the standing crop 134 to harvest, a rate at which the harvester 102 is to be moved while harvesting the standing crop 134, whether to activate the conditioner 114, and whether to activate the header 106 of the harvester 102, among other operations performed by the harvester 102. Similarly, the control module(s) 810 of the harvester 102 may provide an indication to the control module(s) 820 of the modular unit 104 when the header 106 of the harvester 102 is activated, when the conditioner 114 of the harvester is activated, a speed at which the harvester 102 is moving during a harvesting operation, and a rate of harvested material being harvested by the header 106, among other operations performed by the harvester 102.

Figure 9:
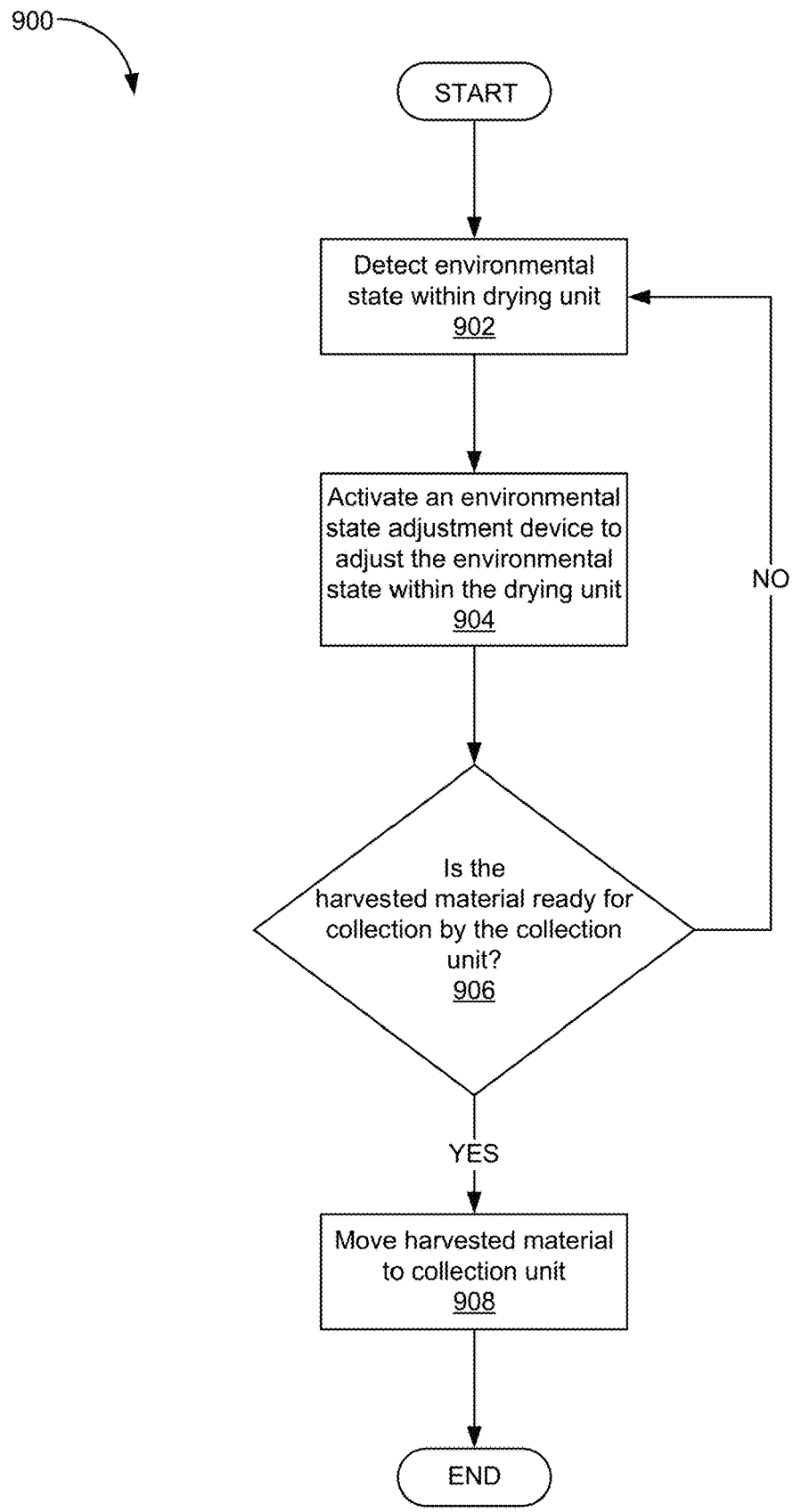
FIG. 9 is a flowchart showing a method of drying a harvested material, according to an example of the principles described herein.

FIG. 9 is a flowchart showing a method 900 of drying a harvested material, according to an example of the principles described herein. The functions described in connection with the method 900 of FIG. 9 may be controlled by the control module(s) 810, 820. The method 900 may include, at 902, detecting environmental state within the drying unit 302 of the modular unit 104. At 902, the control module(s) 820 of the modular unit 104 may activate the sensor(s) 830 to obtain data defining the environmental state within the drying unit 302 and receive that data for further processing. At 904, the control module(s) 820 of the modular unit 104 may activate at least one of the environmental state adjustment devices 322 to adjust the state of the environment within the drying unit 302 based on the data obtained from the sensor(s) 830 at 902. For example, the sensor(s) may include sensors capable of detecting the temperature and the humidity levels of the air within the drying unit 302, and the control module(s) 820 of the modular unit 104 may activate the environmental state adjustment devices 322 to adjust the temperatures and humidity levels within the drying unit 302 that is conducive to causing the harvested material located in the drying unit 302 to dry to a predetermined level. The predetermined level of dryness may include a level of humidity, for example within the drying unit 302 dropping below a predetermined level so as to avoid a state within the harvested material where mold may grow or a situation where spontaneous combustion may occur. In one example, a number of thresholds may be set autonomously or by a user that defines an acceptable level of humidity within the drying unit 302 before the drying unit 302 finishes dying the harvested material.

At 906, the control module(s) 820 of the modular unit 104 may determine whether the harvested material within the drying unit 302 is ready for collection by the collection unit 838 (402, 502, 602 of FIGS. 4 through 6). To do so, the control module(s) 820 of the modular unit 104 determines whether the data obtained from the sensor(s) 830 indicate that the environment within the drying unit 302 is within the predetermined parameters or below at least one threshold indicating that the harvested material is dry enough to collect into bales, cubes, pellets, or otherwise aggregated. In response to a determination that the harvested material is not ready for collection (e.g., the harvested material is not dry) (determination NO, 906), the method may loop back to 902 where the environment within the drying unit 302 is detected. In this manner, the looping of the method between 902, 904, and 906 provides for a periodic or continuous determination of the dryness of the harvested material before collection.

In response to a determination that the harvested material is ready for collection (e.g., the harvested material is sufficiently dry based on the thresholds) (determination YES, 906), the method may include moving the harvested material into the collection unit 838 (402, 502, 602 of FIGS. 4 through 6) at 908. In one example, the door(s) 836 may be activated to open, and the conveyor systems 834 may be used to move the harvested material from the drying unit 302 into the collection unit 838 for collection.

Figure 10:
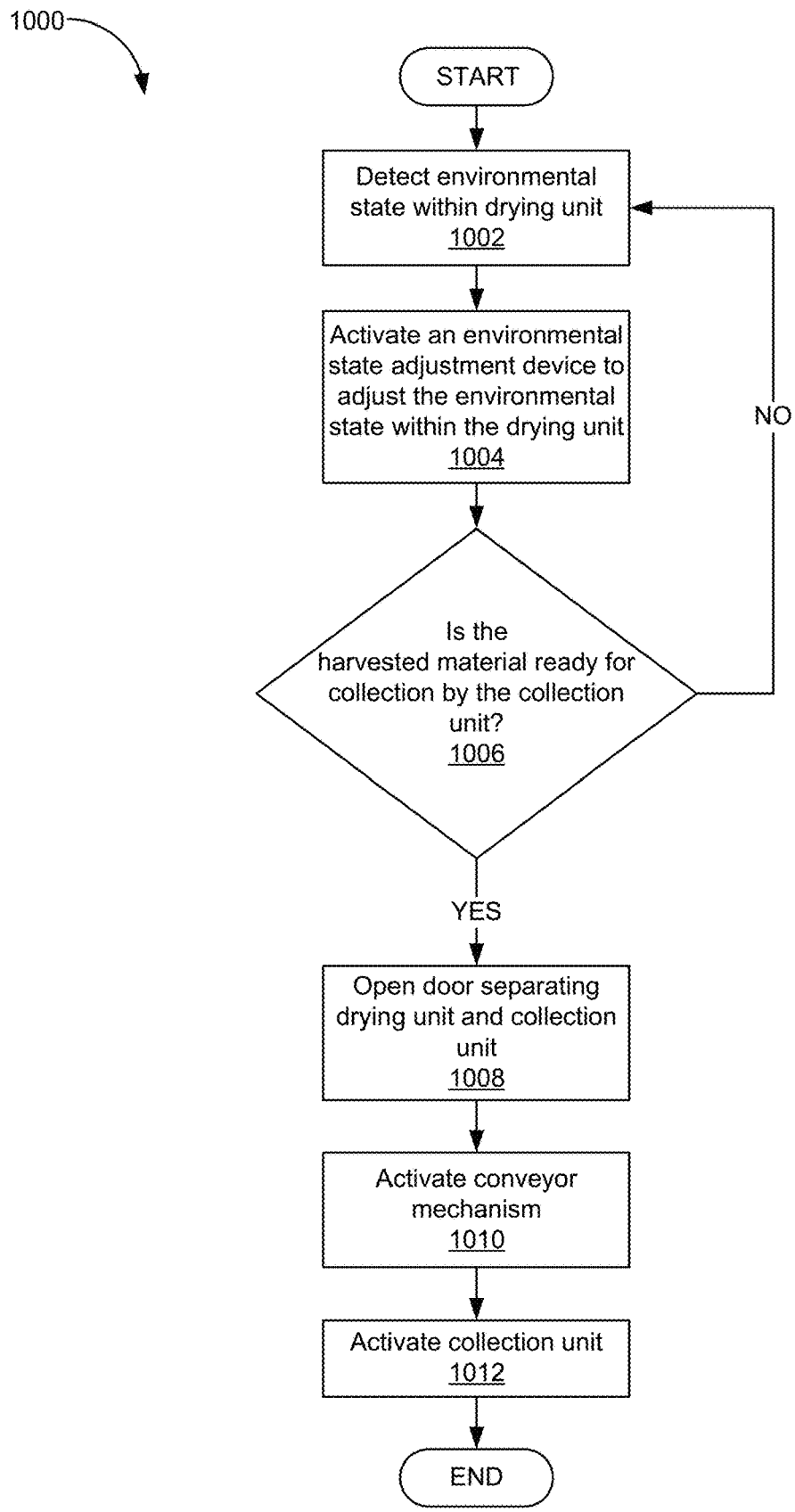
FIG. 10 is a flowchart showing a method of drying and collecting a harvested material, according to an example of the principles described herein.

FIG. 10 is a flowchart showing a method 1000 of drying and collecting a harvested material, according to an example of the principles described herein. The functions described in connection with the method 1000 of FIG. 10 may be controlled by the control module(s) 810, 820. The method 1000 may include, at 1002, detecting environmental state within the drying unit 302 of the modular unit 104. At 1002, the control module(s) 820 of the modular unit 104 may activate the sensor(s) 830 to obtain data defining the environmental state within the drying unit 302 and receive that data for further processing. At 1004, the control module(s) 820 of the modular unit 104 may activate at least one of the environmental state adjustment devices 322 to adjust the state of the environment within the drying unit 302 based on the data obtained from the sensor(s) 830 at 1002. For example, the sensor(s) may include sensors capable of detecting the temperature and the humidity levels of the air within the drying unit 302, and the control module(s) 820 of the modular unit 104 may activate the environmental state adjustment devices 322 to adjust the temperatures and humidity levels within the drying unit 302 that is conducive to causing the harvested material located in the drying unit 302 to dry to a predetermined level. The predetermined level of dryness may include a level of humidity, for example within the drying unit 302 dropping below a predetermined level so as to avoid a state within the harvested material where mold may grow or a situation where spontaneous combustion may occur. In one example, a number of thresholds may be set autonomously or by a user that defines an acceptable level of humidity within the drying unit 302 before the drying unit 302 finishes dying the harvested material.

At 1006, the control module(s) 820 of the modular unit 104 may determine whether the harvested material within the drying unit 302 is ready for collection by the collection unit 838 (402, 502, 602 of FIGS. 4 through 6). To do so, the control module(s) 820 of the modular unit 104 determines whether the data obtained from the sensor(s) 830 indicate that the environment within the drying unit 302 is within the predetermined parameters or below at least one threshold indicating that the harvested material is dry enough to collect into bales, cubes, pellets, or otherwise aggregated. In response to a determination that the harvested material is not ready for collection (e.g., the harvested material is not dry) (determination NO, 1006), the method may loop back to 1002 where the environment within the drying unit 302 is detected. In this manner, the looping of the method between 1002, 1004, and 1006 provides for a periodic or continuous determination of the dryness of the harvested material before collection.

In response to a determination that the harvested material is ready for collection (e.g., the harvested material is sufficiently dry based on the thresholds) (determination YES, 1006), the method may include opening the second door 328, 836 separating the drying unit 302 and the collection unit 838 (402, 502, 602 of FIGS. 4 through 6) at 1008. Further, the method 1000 includes activating the conveyor systems 834 at 1010 to move the harvested material from the drying unit 302 into the collection unit 838 for collection. Further, the method 1000, at 1012, includes activating the collection unit 838 to collect or aggregate the harvested material into bales, cubes, or pellets.

Figure 11:
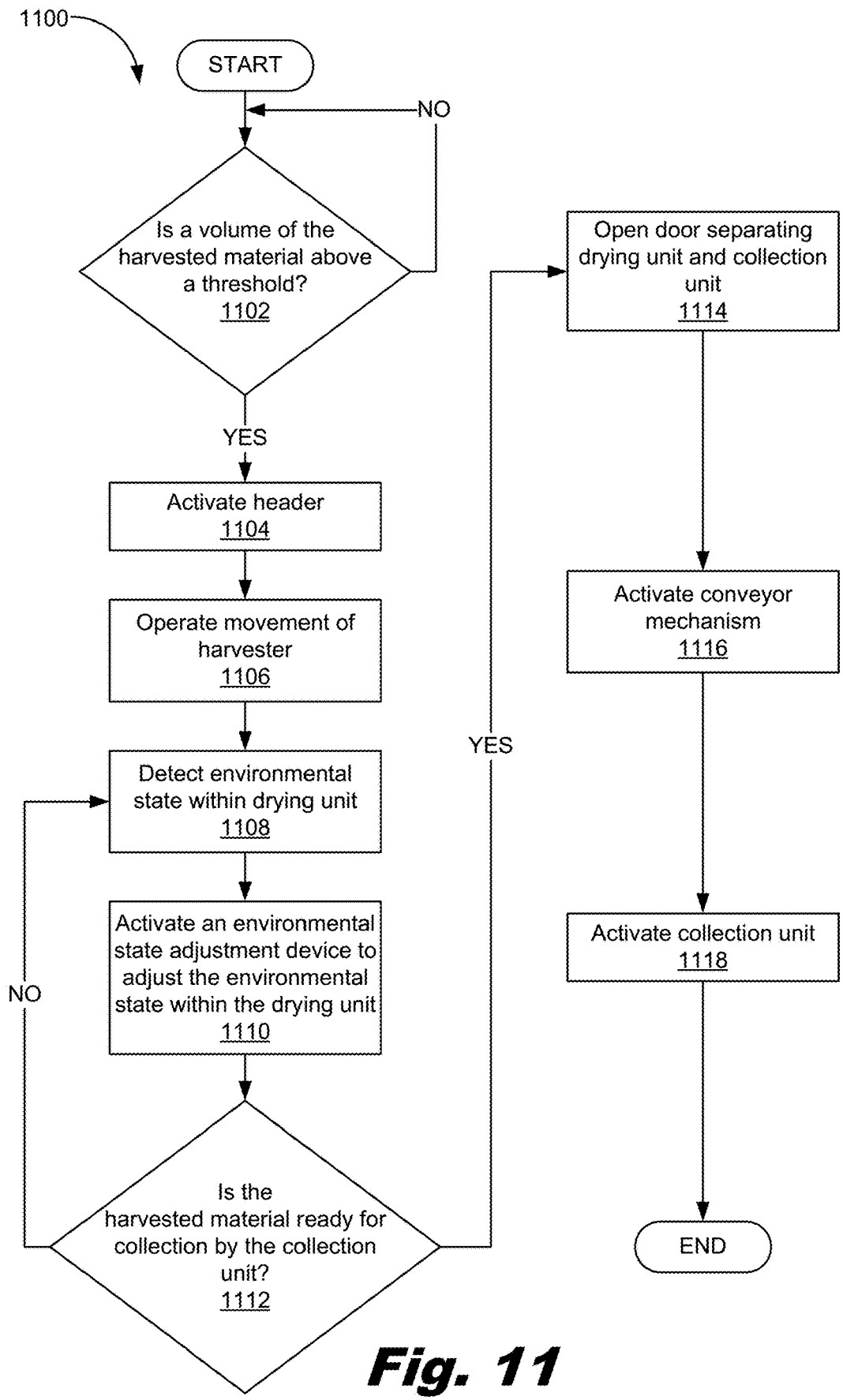
FIG. 11 is a flowchart showing a method of harvesting, drying, and collecting a harvested material, according to an example of the principles described herein.

FIG. 11 is a flowchart showing a method 1100 of harvesting, drying, and collecting a harvested material, according to an example of the principles described herein. The functions described in connection with the method 1100 of FIG. 11 may be controlled by the control module(s) 810, 820. The method 1100 of FIG. 11 may include, at 1102, determining whether a volume of harvested material within the drying unit 302 of the modular unit 104 is above a threshold. The threshold may be predetermined, or user selected or defined. Further, the threshold may define a volume of the harvested material within the drying unit 302 that includes an effective amount of harvested material for a drying cycle. The effective amount of harvested material may take into consideration a rate at which the drying unit 302 is able to dry the harvested material, a rate at which the harvested material is harvested by the header 106 and ingested into the harvester 102, a rate at which the collection unit 838 (402, 502, 602 of FIGS. 4 through 6) collects and dispenses the harvested material, and other rates that define an efficiency of the harvesting system 100 in harvesting, drying, and collecting the harvested material. In one example, the control module(s) 820 of the modular unit 104 may activate the sensor(s) 830 to determine the volume of the harvested material harvested by the header 106, a volume of harvested material within the drying unit 302, a volume of harvested material within the collection unit 838 (402, 502, 602 of FIGS. 4 through 6), and other metrics. In this example, the sensor(s) 830 may include optical sensors, mass sensors, weight sensors, or other sensors that determine the volume of the harvested material.

In response to a determination at 1102 that the volume of the harvested material within the drying unit 302 (1102, determination NO), the method may loop back to before 1102 in order to allow additional harvested material to enter the drying unit 302 for drying. In response to a determination at 1102 that the volume of the harvested material within the drying unit 302 (1102, determination YES), the method may include activating the header 1104 to which the drying unit 302 is coupled to harvest the standing crop 134. Thus, as a first volume of harvested material is being dried within the drying unit 302, the control module(s) 810 of the harvester 102 may activate the header 1104 to harvest a second volume of the standing crop 134 to obtain more harvested material for processing.

The control module(s) 810 of the harvester 102 and/or the control module(s) 810 of the harvester 102 may operate the movement of the harvester 102 at 1106. The speed at which the harvester 102 moves along a surface while harvesting the standing crop 134 may be affected by the rate at which the drying unit may dry the harvested material 302. For example, the control module(s) 810 of the harvester 102 and/or the control module(s) 810 of the harvester 102 may determine a rate at which the harvested material is dried in the drying unit 302 and reduce or increase the speed of the harvester 102 and, as a result, a rate of harvesting the standing crop 134, in order to ensure that the drying unit 302 and the harvesting system 100 as a whole is not overwhelmed by too much harvested material. In one example, the control module(s) 810 of the harvester 102 and/or the control module(s) 810 of the harvester 102 may cause the harvester 102 to stop periodically before moving forward again to allow the drying unit 302 to complete a drying cycle of harvested crop present within the drying unit 302.

At 1108, an environmental state within the drying unit 302 may be detected. In one example, the control module(s) 820 of the modular unit 104 may activate the sensor(s) 830 to detect the environmental state within the drying unit 302 as described herein. Data defining the detected environmental state may be sent by the sensor(s) 830 to the control module(s) 820 for processing. Based on the detected environmental state, the control module(s) 820 may activate at least one of the environmental state adjustment devices 322 of the drying unit 302 at 1110 to adjust the environmental state within the drying unit 302.

At 1112, the control module(s) 820 of the modular unit 104 may determine whether the harvested material is ready for collection by the collection unit 838 (402, 502, 602 of FIGS. 4 through 6). The control module(s) 820 may make such a determination at 1112 based on the detection and adjustment of the environmental state in the drying unit 302. Thus, the control module(s) 820 may activate the sensor(s) 830 periodically or continually to determination whether the environmental state within the drying unit 302 indicates that the harvested material is dry and ready for collection by the collection unit collection unit 838 (402, 502, 602 of FIGS. 4 through 6). In response to a determination that the harvested material is not ready for collection by the collection unit collection unit 838 (402, 502, 602 of FIGS. 4 through 6) (1112, determination NO), the method 1100 may loop back to 1108 where the environmental state within the drying unit 302 may be detected, and to 1110 where the environmental state is adjust within the drying unit 302 based on the detected environmental state. Looping the method in this manner allows for periodic and/or continuous determination of the environmental state within the drying unit 302 to ensure that the harvested material is dried to a point where the harvested material will not be affected by mold, spontaneous combustion, or other effects that may occur if the harvested material were collected undried.

In response to a determination that the harvested material is ready for collection by the collection unit collection unit 838 (402, 502, 602 of FIGS. 4 through 6) (1112, determination YES), the method 1100 may include opening the door 328, 836 separating the drying unit 302 and the collection unit 838 (402, 502, 602 of FIGS. 4 through 6) at 1114. Further, the method 1100 includes activating the conveyor systems 834 at 1116 to move the harvested material from the drying unit 302 into the collection unit 838 for collection. Further, the method 1100, at 1118, includes activating the collection unit 838 to collect or aggregate the harvested material into bales, cubes, or pellets.

In an example of the present disclosure, a harvester includes a harvester and at least one modular unit mechanically coupled to the harvester and powered by the harvester. The modular unit includes a drying unit to dry a harvested material introduced into the harvester. The drying unit includes at least one rotating drum, a number of appendages extending from the at least one rotating drum, at least one sensor to determine at least one environmental state within the drying unit, and at least one environmental state adjustment device to adjust at least one environmental attribute within the drying unit. The modular unit also includes a collection unit to collect the harvested material into a unit, a first conveyor mechanism to convey the harvested material from the drying unit to the collection unit, and a control system to control at least the harvester, the drying unit, the collection unit, the first conveyor mechanism, the sensor, and the environmental state adjustment device based on a signal received from the at least one sensor.

The harvesting system may also include at least one module coupling device to mechanically couple the modular unit to the harvester. The at least one modular unit includes a plurality of modular units, and the plurality of modular units may be coupled to one another when stacked via the at least one module coupling device.

The harvesting system may further include a header. The header may include a cutting implement to cut a standing crop to create the harvested material, and a reel to position the standing crop adjacent the cutting implement to cut the standing crop. The harvesting system may further include a conditioner to condition the harvested material before the harvested material is introduced into the drying unit.

The control system of the harvesting system includes at least one control module, memory communicatively coupled to the control module, the memory storing one or more instructions that, when executed by the control module, cause the one or more processors to perform operations including instructing the at least one sensor to detect the at least one environmental state within the drying unit, activating the environmental state adjustment device to adjust the at least one environmental state within the drying unit, and determining that the harvested material is ready for collection by the collection unit based on the at least one environmental state detected within the drying unit.

The operations further include, based on the determining, opening a door separating the drying unit and the collection unit, activating the first conveyor mechanism to convey the harvested material from the drying unit to the collection unit, and activating the collection unit to collect the harvested material into the unit. The collection unit is a baler, a cuber, or a pelletizer.

In another example of the present disclosure, a modular unit for attachment to a harvester includes a drying unit to dry a harvested material introduced into the harvester. The drying unit includes at least one rotating drum, a number of appendages extending from the at least one rotating drum, at least one sensor to determine at least one environmental state within the drying unit, and at least one environmental state adjustment device to adjust at least one environmental attribute within the drying unit. The modular unit also includes a collection unit to collect the harvested material into a unit, a first conveyor mechanism to convey the harvested material from the drying unit to the collection unit, and a control system to control at least the drying unit, the collection unit, the first conveyor mechanism, the sensor, and the environmental state adjustment device based on a signal received from the at least one sensor.

The modular unit may further include a second conveyor mechanism to convey the harvested material from a position outside the modular unit into the drying unit, the control system to activate the second conveyor mechanism. The modular unit may further include a third conveyor mechanism to convey the harvested material from a position inside the collection unit to a position outside the collection unit of the modular unit. The drying unit further includes a fire suppressant system. The modular unit may further include a pneumatic system fluidically coupled to at least the drying unit, the collection unit, and the first conveyor mechanism. The control system controls the pneumatic system to drive at least the drying unit, the collection unit, and the first conveyor mechanism. The collection unit is a baler, a cuber, or a pelletizer.

The modular unit further includes a frame surrounding at least the drying unit and the collection unit, a number of side panels coupled to the frame to cover at least the drying unit and the collection unit during storage, at least one loading device to accommodate loading of the modular unit onto the harvester, and at least one module coupling device to mechanically couple the modular unit to the harvester. The side panels are convex such that an exterior of the side panels extend away from an interior of the modular unit.

In yet another example of the present disclosure, one or more non-transitory computer-readable media storing executable instructions that, when executed by one or more processors of at least one control system to control at least one function of a modular unit coupled to a harvester, cause the one or more processors to perform operations. The operations include instructing at least one sensor to detect at least one environmental state within a drying unit containing a harvested material, activating an environmental state adjustment device to adjust the at least one environmental state within the drying unit, and determining that the harvested material is ready for collection by a collection unit based on the at least one environmental state detected within the drying unit.

The operations further include, in response to the determining, opening a door separating the drying unit and the collection unit, activating at least one conveyor mechanism to convey the harvested material from the drying unit to the collection unit, and activating the collection unit to collect the harvested material into a unit. The operations further include determining a volume of the harvested material within the drying unit, activating a header coupled to the harvester to which the drying unit is coupled, the header to harvest a standing crop and the activation being based at least in part on the volume of the harvested material within the drying unit, and operating movement of the harvester to which the drying unit is coupled based at least in part on the volume of the harvested material within the drying unit. The at least one control system is housed in the harvester, in the modular unit, or combinations thereof. The at least one control system controls at least one function of the harvester.

INDUSTRIAL APPLICABILITY

The present disclosure describes systems and methods for harvesting, conditioning, drying, and collecting a standing crop in a single pass of a harvesting system. The systems and methods described herein reduce waste in harvesting a standing crop by not allowing the crop, after harvesting, to lie in the field and be subjected to environmental elements that may reduce the nutrient value of the harvested crop. The systems and methods described herein, instead, collect the harvested material directly after harvesting into a viable, nutrient-filled feed product. Thus, such systems and methods may be used to more efficiently harvest a usable and more nutrient-filled product on a consistent basis.

Further, the systems and methods described herein impact agricultural markets by providing a more efficient process of harvesting crops with a consistently superior value resulting in a decrease in costs to users and benefiting other processes downstream including livestock ranching and agriculture end products including dairy products and meat products, renewable energy sources as burnable straw pellets, among others. Crop harvested using the systems and methods described herein result in a higher quality of crop-eating animals, bringing about a greater weight gain per volume or weight of the harvested crop. Further, the health to each breed and species of animal may be benefitted from consumption of the high-quality crop harvested using the systems and methods described herein. Thus, the chances of livestock becoming sick due to consuming dusty or moldy crop is significantly reduced or eliminated. Still further, the chances of pregnant livestock losing off spring in utero due to the consumption of dusty or moldy crop is also significantly reduced or eliminated.

Further, the harvested crop obtained via the systems and methods described herein are relatively higher quality and may be sold at a premium by the user creating a situation where a return on investment in the harvester is realized more quickly. Further, the increase in crop harvesting may allow users to export their crop to other markets including foreign markets. Being able to harvest a superior crop via the systems and methods described herein increases savings to the user and the user's insurance providers since the high-quality crop is less susceptible to spontaneous combustion which can damage or destroy farming equipment and facilities.

Further, because of the modular nature of the harvester and its modular units providing a wide variety of functions associated with the drying unit of each modular unit, the need to purchase additional, specialized equipment is reduced or eliminated. This additional equipment may include, for example, swathers, side rakes, balers, cubers, pelletizers, and windrowing devices and equipment, among other types of farming equipment. Further, having a plurality of modular units available to the user allows for different tasks such as baling, cubing, pelletizing, etc., to be accomplished simultaneously and also allows the modular units to be shared among different users performing work on different farms.

Still further, the use of the systems and methods described herein result in a decrease in costs associated with maintenance of a number of machines and reduces overall fuel costs associated with the operation of those machines. Further, labor associated with these tasks is also significantly reduced or eliminated via use of the systems and methods described herein. Still further, the use of the systems and methods described herein allows for the user to determine, in a more flexible manner, the timing of a harvest of the standing crop. This allows for the user to produce a harvested crop at a more economically beneficial time, possibly creating more crops or tonnage of quality product per year.

While aspects of the present disclosure have been particularly shown and described with reference to the examples above, it will be understood by those skilled in the art that various additional examples may be contemplated by the modification of the disclosed machines, systems, and methods without departing from the spirit and scope of what is disclosed. Such examples should be understood to fall within the scope of the present disclosure as determined based upon the claims and any equivalents thereof.

What is claimed is:

1. A harvesting system comprising:
   a harvester; and
   a modular unit mechanically coupled to the harvester and powered by the harvester, the modular unit comprising:
      a shipping container;
      a drying unit housed within the shipping container to dry a harvested material introduced into the harvester;
      a collection unit housed within the shipping container to collect the harvested material;
      a conveyor mechanism housed within the shipping container to convey the harvested material from the drying unit to the collection unit; and
      a control system to control the harvester, the drying unit, the collection unit, and the conveyor mechanism.

2. The harvesting system of claim 1, wherein the drying unit comprises:
   a rotating drum;
   a plurality of appendages extending from the rotating drum;
   a sensor to determine an environmental state within the drying unit; and
   an environmental state adjustment device to adjust an environmental attribute within the drying unit.

3. The harvesting system of claim 1, further comprising a module coupling device to selectively mechanically couple and decouple the modular unit to the harvester, the module coupling device comprising a twistlock system.

4. The harvesting system of claim 3, wherein:
   the modular unit comprises a plurality of modular units, and
   the plurality of modular units may be coupled to one another when stacked via the module coupling device.

5. The harvesting system of claim 1, further comprising:
   a header comprising:
      a cutting implement to cut a standing crop to create the harvested material;
      a reel to position the standing crop adjacent the cutting implement to cut the standing crop; and
      a conditioner to condition the harvested material before the harvested material is introduced into the drying unit.

6. The harvesting system of claim 1, wherein the control system comprises:
   a control module; and
   memory communicatively coupled to the control module, the memory storing one or more instructions that, when executed by the control module, cause one or more processors to perform operations comprising:

instructing a sensor to detect an environmental state within the drying unit;
activating an environmental state adjustment device to adjust the environmental state within the drying unit; and
determining that the harvested material is ready for collection by the collection unit based on the environmental state detected within the drying unit.

7. The harvesting system of claim 6, wherein the operations further comprises:
based on the determining operation:
opening a door separating the drying unit and the collection unit;
activating a first conveyor mechanism to convey the harvested material from the drying unit to the collection unit; and
activating the collection unit to collect the harvested material into the unit.

8. The harvesting system of claim 1, wherein the collection unit is a baler, a cuber, or a pelletizer.

9. A modular unit for attachment to a harvester, comprising:
a shipping container;
a drying unit housed within the shipping container to dry a harvested material introduced into the harvester;
a control system to control the drying unit, a sensor, and an environmental state adjustment device based on a signal received from the sensor; and
a module coupling device to selectively mechanically couple and decouple the modular unit to the harvester, the module coupling device comprising a twistlock system.

10. The modular unit of claim 9, wherein the drying unit comprises:
a rotating drum; and
a plurality of appendages extending from the rotating drum.

11. The modular unit of claim 9, further comprising:
a collection unit housed within the shipping container to collect the harvested material into a unit;
a first conveyor mechanism housed within the shipping container to convey the harvested material from the drying unit to the collection unit;
a second conveyor mechanism to convey the harvested material from a position outside the modular unit into the drying unit, the control system to activate the second conveyor mechanism; and
a third conveyor mechanism to convey the harvested material from a position inside the collection unit to a position outside the collection unit of the modular unit.

12. The modular unit of claim 11, further comprising a pneumatic system fluidically coupled to at least the drying unit, the collection unit, and the first conveyor mechanism, wherein the control system controls the pneumatic system to drive at least the drying unit, the collection unit, and the first conveyor mechanism.

13. The modular unit of claim 11, further comprising:
a frame surrounding at least the drying unit and the collection unit; and
a side panel coupled to the frame to cover at least the drying unit and the collection unit during storage;
wherein the side panels are convex such that an exterior of the side panels extend away from an interior of the modular unit.

14. The modular unit of claim 11, wherein the collection unit is a baler, a cuber, or a pelletizer.

15. One or more non-transitory computer-readable media storing executable instructions that, when executed by one or more processors of a control system, the executable instructions causing the one or more processors to perform operations comprising:
instructing a sensor of a modular unit comprising a shipping container to detect an environmental state within a drying unit containing a harvested material, the drying unit being housed in the shipping container; and
activating an environmental state adjustment device to adjust the environmental state within the drying unit.

16. The one or more non-transitory computer-readable media of claim 15, the operations further comprising determining that the harvested material is ready for collection by a collection unit based on the environmental state detected within the drying unit.

17. The one or more non-transitory computer-readable media of claim 16, the operations further comprising:
in response to the determining:
opening a door separating the drying unit and the collection unit;
activating a conveyor mechanism to convey the harvested material from the drying unit to the collection unit; and
activating the collection unit to collect the harvested material into a unit.

18. The one or more non-transitory computer-readable media of claim 15, the operations further comprising:
determining a volume of the harvested material within the drying unit;
activating a header coupled to the harvester to which the drying unit is coupled, the header to harvest a standing crop and the activation being based at least in part on the volume of the harvested material within the drying unit; and
operating movement of the harvester to which the drying unit is coupled based at least in part on the volume of the harvested material within the drying unit.

19. The one or more non-transitory computer-readable media of claim 15, wherein the control system is housed in the harvester, in the modular unit, or combinations thereof.

20. The one or more non-transitory computer-readable media of claim 15, wherein the control system controls at least one function of the harvester.

* * * * *